(12) United States Patent
Wang

(10) Patent No.: US 8,745,065 B2
(45) Date of Patent: Jun. 3, 2014

(54) QUERY PARSING FOR MAP SEARCH

(75) Inventor: Yu Wang, Beijing (CN)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 13/383,181

(22) PCT Filed: Jul. 7, 2009

(86) PCT No.: PCT/CN2009/072667
§ 371 (c)(1),
(2), (4) Date: Feb. 8, 2012

(87) PCT Pub. No.: WO2011/003232
PCT Pub. Date: Jan. 13, 2011

(65) Prior Publication Data
US 2012/0278339 A1 Nov. 1, 2012

(51) Int. Cl.
*G06F 17/30* (2006.01)
*G06F 17/21* (2006.01)

(52) U.S. Cl.
CPC ............... *G06F 17/30* (2013.01); *G06F 17/21* (2013.01)
USPC ........... 707/748; 707/688; 707/708; 707/723; 707/730; 707/755; 707/767; 707/770; 704/10

(58) Field of Classification Search
CPC ................................. G06F 17/30; G06F 17/21
USPC ........... 340/990–994, 995.1, 995.14–995.15; 701/527–533; 704/250–251, 9–10; 715/748, 733, 838; 345/650–656, 345/660–661; 707/700–708, 720–725, 688, 707/730, 748, 754–755, 766–767, 769–770
See application file for complete search history.

(56) References Cited

U.S. PATENT DOCUMENTS

| 7,207,012 B1 * | 4/2007 | House et al. .................. 715/853 |
| 8,015,172 B1 * | 9/2011 | Cave et al. .................... 707/706 |
| 8,359,309 B1 * | 1/2013 | Provine et al. ................ 707/721 |
| 2003/0061211 A1 | 3/2003 | Shultz et al. |

(Continued)

FOREIGN PATENT DOCUMENTS

| EP | 1657656 A2 * | 5/2006 |
| GB | 2460045 A | 11/2009 |
| JP | 2009104450 A | 7/2011 |
| KR | 2011024571 | 3/2011 |

OTHER PUBLICATIONS

Mei Kun et al., "An Ontology-Based Approach for Geographic Information Retrieval on the Web", IEEE 2007, pp. 5959-5962.*

(Continued)

*Primary Examiner* — Srirama Channavajjala
(74) *Attorney, Agent, or Firm* — Bracewell & Giuliani LLP

(57) ABSTRACT

Implementations for computer-based systems, apparatus and methods for map search based on user query parsing. For example, a computer-implemented map search method is provided to include parsing an input entry from a user for map search into a location part indicating location information in the input search entry and a query part indicating a search target associated with the location part in the input entry; and conducting a map search to obtain a geographic area or location based on the location part and to search for information on one or more entities that are associated with the query part and that are located at, within, or near the obtained geographic area or location.

19 Claims, 15 Drawing Sheets

(56) References Cited

U.S. PATENT DOCUMENTS

| | | |
|---|---|---|
| 2004/0236730 A1 | 11/2004 | Frank |
| 2006/0241933 A1* | 10/2006 | Franz ............................. 704/2 |
| 2007/0027672 A1* | 2/2007 | Decary et al. ..................... 704/7 |
| 2008/0016055 A1* | 1/2008 | Riise et al. ....................... 707/5 |
| 2008/0120129 A1* | 5/2008 | Seubert et al. .................... 705/1 |
| 2008/0319990 A1* | 12/2008 | Taranenko et al. ............... 707/5 |
| 2009/0037174 A1* | 2/2009 | Seltzer et al. ................. 704/251 |
| 2009/0182554 A1* | 7/2009 | Abraham et al. ................. 704/9 |
| 2009/0210388 A1* | 8/2009 | Elson et al. ....................... 707/3 |
| 2009/0326914 A1* | 12/2009 | Joy et al. ........................... 704/3 |
| 2010/0010959 A1* | 1/2010 | Broder et al. ..................... 707/2 |
| 2010/0082240 A1* | 4/2010 | Short .............................. 701/208 |
| 2011/0113064 A1 | 5/2011 | Govindachetty et al. |

OTHER PUBLICATIONS

Luo XianGang et al. "The Application and Realization of Map Search Engine in WEBGIS", International Conference on Environmental Science and Information Application Technology, 2009, 728-731.*

Michalowski, Martin et al., "Retrieving and Semantically Integrating Heterogeneous Data from the Web," IEEE Intelligent Systems, May/Jun. 2004, pp. 72-79, IEEE Computer Society, US.

Copending U.S. Appl. No. 13/801,023, entitled "Systems, Methods, and Computer-Readable Media for Interpreting Geographical Search Queries," by Radu Jurca., filed Mar. 13, 2013.

* cited by examiner

QUERY PARSING FOR MAP SEARCH

CROSS-REFERENCE TO RELATED APPLICATIONS

This application is a National Stage application under 35 U.S.C. §371 and claims benefit of International Application No. PCT/CN2009/072667 having an International Filing Date of Jul. 7, 2009.

TECHNICAL FIELD

This patent document relates to map search, including systems, apparatus and methods for map search.

BACKGROUND

Map search is computer-based searches in digital geographic maps and databases provided by one or more computer servers in one or more communication networks, such as the Internet. Computer users can use a map search engine which is a computer program to search and retrieve documents, files or data from digital geographic maps and associated databases.

SUMMARY

Implementations for computer-based systems, apparatus and methods for map search based on user query parsing are provided.

In one aspect, a computer-implemented map search method is provided to include parsing an input entry from a user for map search into a location part indicating location information in the input search entry and a query part indicating a search target associated with the location part in the input entry; and conducting a map search to obtain a geographic area or location based on the location part and to search for information on one or more entities that are associated with the query part and that are located at, within, or near the obtained geographic area or location.

In another aspect, a computer-implemented map search method is provided to include separating an input entry received from a user for map search into a token sequence comprising one or more tokens, where each token includes a term which represents a segment of the input entry and a type annotated to the term indicating a type of the term; and determining possible splitting positions of the token sequence, where a possible splitting position splits the token sequence into one or two subsequences. This method also includes determining a possible splitting manner for each of the possible splitting positions, each possible splitting manner splitting the token sequence into at least one of (1) a possible location part indicating location information and (2) a possible query part indicating a search target associated with the location part; determining a splitting score for a probability of correctness of each of the possible splitting manners; and selecting the possible splitting manner having the highest splitting score as a resultant splitting manner.

In another aspect, a system that provides computer-implemented map search is provided to include a parsing module that parses an input entry received from a user for map search into at least one of a location part and a query part; and a search module that receives output from the parsing module and, after receiving the parsed location part and the query part, searches for information related to the parsed location part and the query part to return map search results to the user. In one implementation, this system can include a computer network that provides communications to the parsing module and the search module, and to computers; and a client computer in communication with the computer network to receive the input entry from the user for map search and to receive results from the search module. The computer network directs the input entry from the client computer to the parsing module and the results from the search module to the client computer.

In another aspect, a system that provides computer-implemented map search is provided to include a token module that tokens an input entry received from a user for map search into a token sequence comprising at least one token, where each token includes a term which represents a segment of the input entry and a type annotated to the term; means for determining possible splitting positions of the token sequence, where a possible splitting position splits the token sequence into one or two subsequences; means for determining a possible splitting manner for each of the possible splitting positions, where each possible splitting manner splits the token sequence into at least one of a possible query part and a possible location part; means for determining a splitting score for each of possible splitting manners; means for selecting the possible splitting manner having the highest splitting score as a resultant splitting manner; and a search module that receives output from the token module to conduct map search and to generate map search results to the user.

In another aspect, a system that provides computer-implemented map search is provided to include an interface to receive an input entry inputted by a user; and a processing unit to parse the input entry to split the input entry into at least one of a location part and a query part and search for information related to the input entry based on the parsing result. If the input entry is split into a location part and a query part, the processing unit determines a geographic area based on the location part, and searches for information on entities which are associated with the query part and located within the geographic area.

In another aspect, a system that provides computer-implemented map search is provided to include an interface to receive an input entry inputted by a user; a process unit to tokenize the input entry into a token sequence that includes at least one token and to determine possible splitting positions of the token sequence. Each token includes a term which represents a segment of the input entry and a type annotated to the term and a possible splitting position splits the token sequence into one or two subsequences. This processing unit determines a possible splitting manner for each of the possible splitting positions, each possible splitting manner splits the token sequence into a possible query part and/or a possible location part; determines a splitting score for each of possible splitting manners; and selects the possible splitting manner having the highest splitting score as a resultant splitting manner.

In another aspect, a machine-readable recording medium which stores instructions is provided. The instructions, when executed by a machine, cause the machine to perform the following: parsing an input entry from a user for map search, prior to conducting the map search based on the input entry, into a location part indicating location information in the input search entry and a query part indicating a search target associated with the location part in the input entry; and conducting a map search to obtain a geographic area or location based on the location part and to search for information on one or more entities that are associated with the query part and that are located at, within, or near the obtained geographic area or location.

In another aspect, a machine-readable recording medium which records a plurality of instructions is provided. The instructions, when executed by a machine, cause the machine to perform the following acts: tokenizing an input entry received from a user into a token sequence comprising at least one token, where each token includes a term which represents a segment of the input entry and a type annotated to the term; determining possible splitting positions of the token sequence, where a possible splitting position splits the token sequence into one or two subsequences; determining a possible splitting manner for each of the possible splitting positions, where each possible splitting manner splits the token sequence into a possible query part and/or a possible location part; determining a splitting score for each of possible splitting manners; and selecting the possible splitting manner having the highest splitting score as a resultant splitting manner.

In yet another aspect, a computer-implemented map search method is provided to include causing an input entry from a user for map search to be parsed, prior to conducting the map search based on the input entry, into a location part indicating location information in the input search entry and a query part indicating a search target associated with the location part in the input entry. The parsing of the input entry is performed without prior searching for geocodes that correspond to a location indicated by the input entry. This method includes causing a map search to be conducted to obtain a geographic area or location based on the location part and to search for information on one or more entities that are associated with the query part and that are located at, within, or near the obtained geographic area or location.

The above and other aspects for computer-implemented map search described in this document can be implemented to realize one or more of the following advantages, including efficient map search, high accuracy in map search results and fast delivery of map search results to a user.

Examples and implementations of the above and other aspects of systems, apparatus and methods for computer-implemented map search are described in detail in the drawings, the description and claims.

BRIEF DESCRIPTION OF DRAWINGS

Like reference symbols in the various drawings indicate like elements.

DETAILED DESCRIPTION

Figure 1:
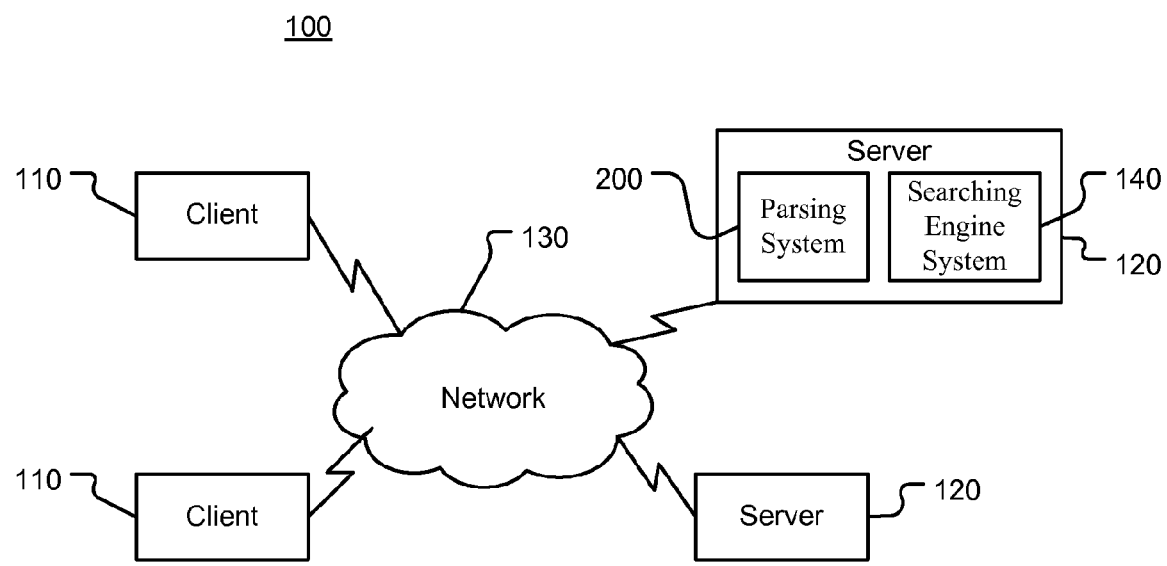
FIG. 1 is an exemplary diagram of a network system 100 in which systems and methods of map search.

In map search described in this document, a map search engine processes an input entry for query entered by the user and provides one or more search results that reflect the user's interest based on the information in the input entry. For example, a user may want to search for information on a certain entity (e.g., business) or a certain kind of entities located at, within or near a specific geographic location. The map search methods and systems described in this document can be implemented to allow a user to enter an input entry in a single box, intelligently recognize a location part of the input entry which represents a geographic location contained in the input entry, and a query part of the input entry which can represent an entity or a certain kind of entities as the search target. For example, a user input entry of "烟台酒店" (Yantai hotel) entered into a single box can be processed to parse into a location part "烟台" (Yantai) which specifies a geographic location, and a query part "酒店" (hotel) which represents the search target located at, within or near the geographic location. Accordingly, the map search engine recognizes that the user intends to find hotels within or around the city of Yantai and performs the map search.

In splitting or parsing an input entry into a location part and a query part, the input entry is first parsed to one or more segments, and the segments are grouped to construct a location part and a query part. During the parsing, a sequence of characters, letters, words or phrases representing address related information is recognized as such and is accordingly parsed as a single meaningful segment referred to as a "term" in this document. This recognition of address related information can be achieved by, for example, using one or more dictionaries or databases containing address related information.

During the parsing of the input entry, a parameter "type" can be assigned or annotated to the term to indicate whether the term contains address related information and, if so, the type of the address related information that the term represents. This type annotation can be used to increase the accuracy of the map search. The type annotation can be performed by, for example, referring to the one or more dictionaries or databases containing address related information used in the parsing operation.

Types annotated to terms can be predefined. For example, the types can include levels of administrative regions such as "省" (province), "市" (city), "区" (district), "县" (county), "乡", "镇", "村" (village), for annotating terms which represent such administrative regions. The types can also include a type "Road" to indicate that a term represents a road or street. Types can also include address suffix or prefix such as "Address Name Suffix", "Direction Suffix" (e.g., south, north, etc.), and "Quantifier Suffix" for indicating that a term corresponds to a specific address suffix or prefix. Notably, a type "None" is defined to annotate a term which does not represent address-related information. This determination of whether a type "None" is assigned to a term depends on the entries in the one or more dictionaries or databases containing address related information used by the map search engine and a type "None" may be assigned to a term which represents a real geographic location but nevertheless does not have a match in the one or more dictionaries or databases containing address related information used in the parsing operation. Types for annotating terms can be specifically defined for different languages based on the characteristics of the languages.

In some implementations, the parsing can be performed before conducting the map search. As such, the search engine can use the location part of the result of the parsing operation to determine a location first, e.g., by searching a geocode database to get geographic codes, known as geocodes, that are denoted by longitudes and latitudes, or, by other methods, when the associated type indicates address-related information and is not "None." When the type for a term is "None," the location determination, e.g. by search for the geocode of the term, is not performed. After a location is determined, for example, after the geocode associated with the location part is found, the search for the query part at or near the location e.g., defined by the geocode is performed and the search result is delivered to the user. An implementation of this approach of first parsing the input entry to extract and identify the location part and the query part and then determining a location by e.g. retrieving the geocode for the location part, can be used to avoid depending on performing map search based on the initial input entry or its segments without pre-processing, e.g., by sending the initial input entry or its segments without pre-processing to a geocode database in search for matched geocodes. and can enable the map search to be executed and delivered in an efficient manner with high accuracy in finding the relevant map search results and in a short search time.

In this document, the operations of parsing and type annotation are collectively referred to as "tokenization". The parsing operation of parsing an input entry into segments and annotating types to the segments of the input entry can be described as tokenizing the input entry into a sequence of tokens, or a token sequence, wherein each token is defined by a term which represents a segment of the input entry and a type annotated to the term that indicates what kind of address-related information the term represents. The location part and query part of the input entry can be determined by splitting the token sequence into a location part and a query part.

In implementing the parsing the input entry into a location part and a query part, a statistical model can be used to provide a statistical scoring to rate different groupings of various possible segments of the input entry and the segments with the highest statistical score can be selected as the result of the parsing operation. The statistical model in this document can be trained based on a training model and using training data obtained from different data sources such as data providers, government agencies, Phone directories such as Yellow pages, and others. The training data comprises addresses and titles which are names of entities (such as business names). In the training model, each of the titles and addresses is tokenized into a token sequence, and the frequency of occurrence in titles and the frequency of occurrence in addresses are recorded with respect to terms, types and certain term sequence and type sequence contained in the token sequence. When splitting a token sequence into a location part and a query part, a score is calculated for each possible splitting based on the frequencies recorded in the statistical model. Based on the scores provided by the statistical model, certain filtering rules can be applied to eliminate improper splittings and to select the proper splitting.

FIG. 1 is an example of a network system 100 suitable for implementing systems and methods of map search described in this document. Network system 100 includes one or more clients 110 connected to or in communication with one or more servers 120 via a network 130 that provides communications for clients 110 and servers 120. The example in FIG. 1 illustrates two clients 110 and two servers 120 for simplicity. In various implementations, the network system 100 may include more or fewer clients 110 and severs 120. In some implementations, a client 110 may perform some functions of a server 120 and a server 120 may perform some functions of a client 110. A map search engine can be implemented in the network system 100 in various configurations, e.g., in one or more servers 120 or in both one or more servers 120 and one or more clients 110.

Clients 110 can be implemented in various forms, including devices such as a mobile phone, a personal computer, a personal digital assistant (PDA), a lap top, etc., or a thread or process running on one of these devices, and/or an object executable by one of these devices. Each client 110 includes a map search interface that receives an input entry from a user and presents searching results for the input entry to the user, and a communication interface that transmits the input entry to one or more servers 120 and receives searching results from the one or more servers 120 via the network 130.

In the example in FIG. 1, each server 120 includes a server entity which comprises a parsing system 200 of a map search engine for parsing an input entry received via network 130 and a map search system 140 of the map search engine for performing map search based on the parsing results of the parsing system 200 and returning searching results. The searching results are transmitted to the clients 110 via network 130. In some implementations, the parsing system 200 and the map search system 140 reside in separate servers. In other implementations, the parsing system 200 is integrated as a part of the map search system 140. Each of the clients 110 and servers 120 can be connected to network 130 via one or more communication links, e.g., wired and wireless communication links and connections.

Network 130 can be implemented in various communication network configurations, such as a local area network (LAN), a wide area network (WAN), a metropolitan area network (MAN), a telephone network, an intranet, the Internet, or a combination of two or more of these and other networks.

Figure 2:
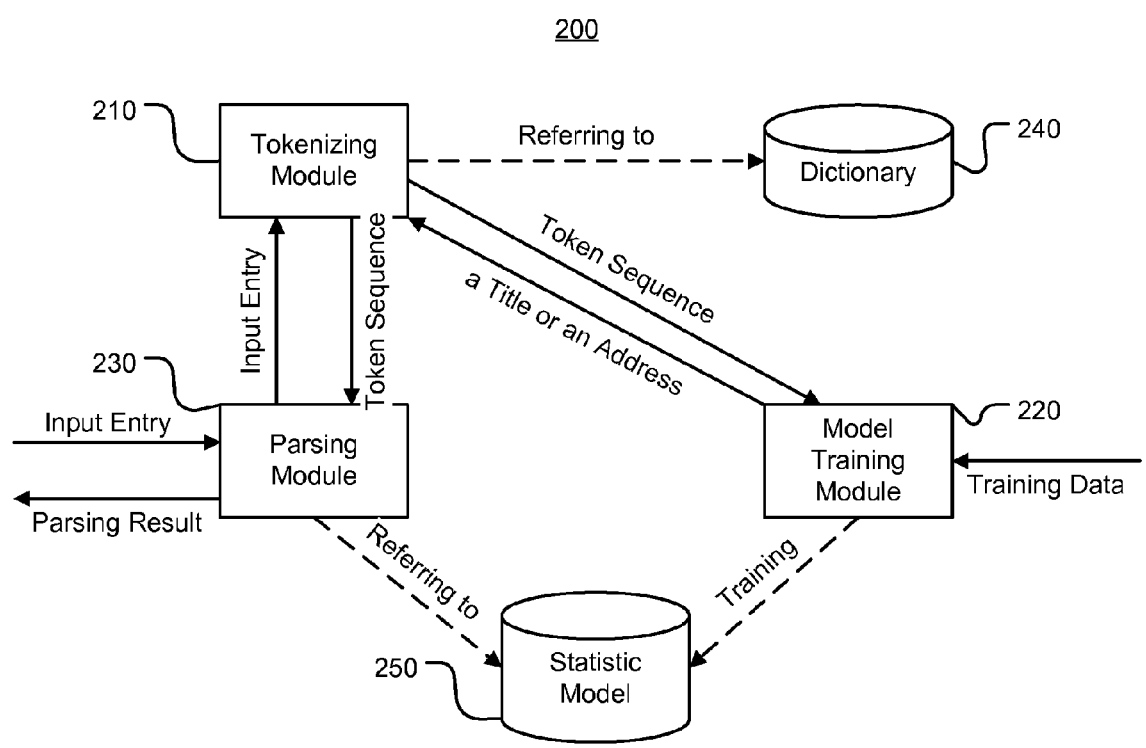
FIG. 2 is a conceptual diagram of a parsing system 200 that splits an input entry into a location part and a query part.

FIG. 2 shows an example of a parsing system 200 that splits or parses an input entry of a query from a user into a location part "where" that represents a location specified by the input entry and a query part "what" that represents a request for searching a target associated with the location. For example, the input entry may be "上海餐厅" ("Shanghai Restaurant") where the "餐厅" ("Restaurant") is the query part indicating that the targets of the user search are restaurants, and "上 海" ("Shanghai") is the location part indicating the location of the search targets is in and near the city of Shanghai. Based on this parsing by the parsing system 200, the map search system 140 searches for "Restaurant" in or near "Shanghai" and returns the search results for delivery to the user.

The parsing system 200 is designed to parse the input entry into smaller pieces and processes the smaller pieces or segments to construct the location part and the query part. The smaller pieces or segments parsed by the parsing system 200 cannot be too small so that the segments statistically have little relevance with one another and require significant processing and thus time delay to construct the meaningful location part and the query part from such small pieces. For example, the above example of the input entry of "上海餐厅" ("Shanghai Restaurant") can be split into various segments: (1) individual Chinese characters "上" (up), "海" (sea), "餐"

(eating or food), and "厅" (building); (2) "上", "海餐", and "厅"; and (3) "上海" (Shanghai) and "餐厅" (Restaurant). The parsed segments in examples (1) and (2) are less useful for constructing the location part and the query part and require additional segmenting and grouping of the smaller pieces to construct the desired location part and the query part. The parsed pieces in the example (3), in contrast, are the proper location part ("上海" for Shanghai) and the query part ("餐厅" for restaurant). Certain languages present challenges in parsing an input entry from a user due to certain properties of the languages. For example, a user query in English consists of English words made of letters with spacing between two adjacent words, such as "Shanghai Restaurant" in which "Shanghai" and "Restaurant" are separated by a space. Such spacing between two adjacent words in English provides natural boundaries for splitting the input entry. However, an input entry for a user query in Chinese, Japanese or Korean can be a sequence of contiguous characters without spacing between two adjacent characters, e.g., "上海餐厅" (Shanghai Restaurant). The parsing system 200 described in this document can be designed to have parsing intelligence based on one or more dictionaries of address-related information including locations and names and suffixes and prefixes used in representing an address and other location and name databases to extract the location information from the input entry and to construct the proper location part and the query part.

As an example, the parsing system 200 can be implemented to include a tokenizer based on one or more dictionaries or databases of address-related information to parse an input entry of a user query so that a location name in the input entry is kept as a single segment by the tokenizer. This tokenizer can use a dictionary that contains administration entity names, region names and road names, and various suffixes and prefixes to perform the parsing of the input entry to minimize undesired separating of a segment in the input entry that is a location name. For example, a Chinese street name "城府路" (Chengfu Road) contained in a Chinese input entry can be kept as one segment by the parsing system 200 instead of being split into smaller pieces. The search accuracy and search response time of such an address-information recognized parsing tend to be superior to using a segmentator system that does not recognize address-related information and segments a location name contained in an input entry into smaller pieces such as segmenting the Chinese street name "城府路" into individual Chinese characters of "城" (cheng), "府" (fu), and "路" (road). In implementations, the tokenizer can annotate a type to a segment of an input entry to indicate whether the segment represents address-related information and if so, the kind of address-related information that the segment represents.

The parsing system 200 in FIG. 2 is a token-based parsing system and, in the illustrated example, includes a tokenizing module 210, a model training module 220, a parsing module 230, a dictionary 240 and a model 250. These modules operate collectively to enable the parsing module 230 to parse an input entry into a location part and a query part for performing a map search. The tokenizing module 210 tokenizes an input entry into tokens based on location information from the dictionary 240 of location names. The parsing module 230 receives input entry from outside, sends the input entry to the tokenizing module 210 for tokenizing, receives the tokens from the tokenizing module 210 and processes the received tokens based on statistical scoring of tokens, sequences of tokens and other items from the model 250 to perform the parsing operation. The model 250 is generated by and trained by the model training module 220 which receives and processes training data obtained from one or more data sources.

The tokenizing module 210 tokenizes an input entry into tokens based on address-related and location-related information which can be obtained from, e.g., the dictionary 240. In implementations, a token can be defined to include a term which represents a segment of the input entry and a type annotated to the term to indicate whether the term represents address-related information and if so, what kind of address-related information the term represents. The tokenizing module 210 can recognize address-related information, and tokenize address-related information into meaningful tokens. For example, the Chinese phrase "城府路" in an input entry can be recognized by the tokenizing module 210 as a road name and be tokenized as a single token consisting of the phrase "城府路" as a term and a type "Road" parameter to indicate the phrase "城府路" represents a road name. The tokenizing module 210 can use a dictionary 240 of address-related or location-related information to perform tokenization. The dictionary 240 stores address-related information.

Figure 3:
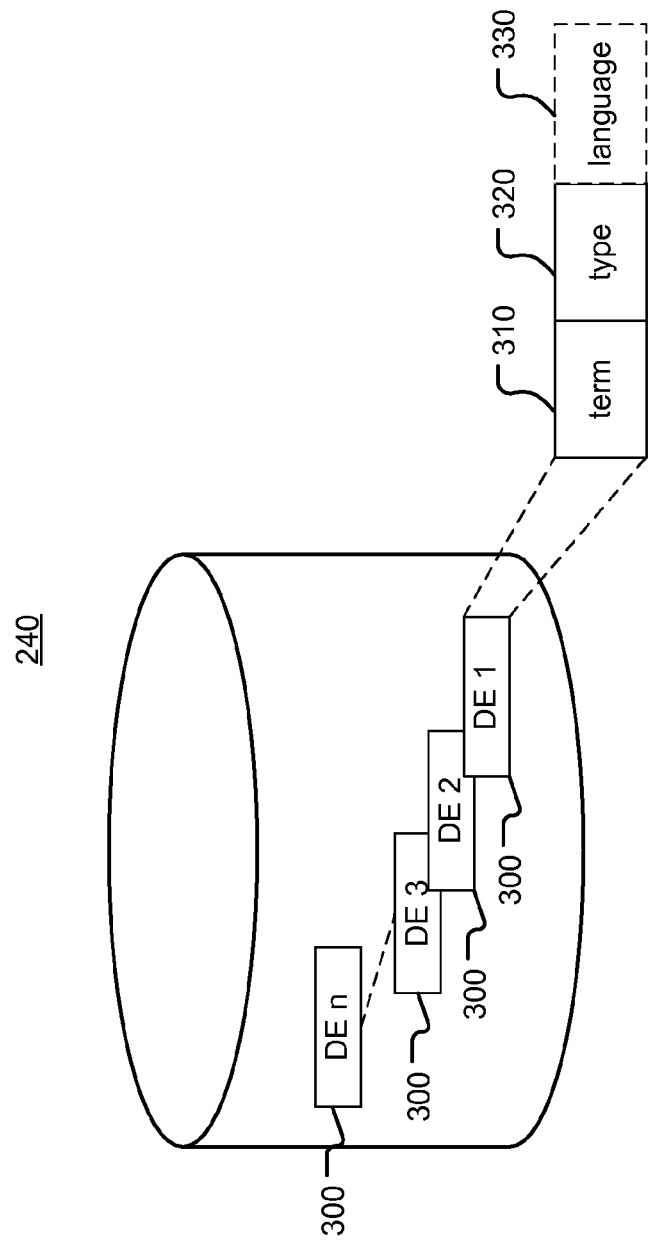
FIG. 3 is a schematic diagram showing an exemplary structure of the dictionary 240 shown in FIG. 2.

FIG. 3 is a schematic diagram showing an exemplary structure of the dictionary 240. The dictionary 240 has dictionary entries (DEs) 300, and each DE 300 has two fields: a term field 310 and a type field 320. The term field 310 stores a term or phrase which represents address-related information. The term can be an address name, for example, a name of an administrative region such as "北京市" (Beijing City), "朝阳区" (Chaoyan District), "朝阳" (Chaoyan), or a road name such as "常德道" (Changde Road) and "城府路" (Chengfu Road). A term can also represent an address-related suffix or an address-related prefix. For example, a term can be an address name suffix such as "省" (province), "市" (city), "区" (district), "县" (county), "乡", "镇", "村" (village), "路" (road), "道" (road), a direction prefix or suffix such as "东" (East), "西" (West), "南" (South), "北" (North), "东北" (Northeast), "东南" (Southeast), "西北" (Northwest), "西南" (Southwest), or a quantifier suffix such as "号" (Number). The terms may also be other words and expressions that can be used to describe an address, for example, numbers. The type field 320 of a DE 300 contains a type which indicates the type of address-related information the term represents. Different types can be defined. For example, types include levels of administrative regions such as "省" (province), "市" (city), "区" (district), "县" (county), "乡", "镇", "村" (village), address suffix or prefix such as "Address Name Suffix", "Direction Suffix", and "Quantifier Suffix." Types can also include a type "Road" which is defined to indicate the corresponding term represents a road name, and a type "Number" which is defined to indicate the corresponding term represents a number, e.g., a street number. Other types may also be defined as necessary. Optionally, a DE 300 of the dictionary 240 further has a language field 330 to indicate the language of the term, e.g., Arabic, Chinese, English, German, Japanese, Korean, etc. In some implementations, the dictionary 240 is built on existing data, such as existing address information databases. In some implementations, dictionary entries of the dictionary can also be predefined as necessary.

Referring back to FIG. 2, the tokenizing module 210 receives an input entry, tokenizes the input entry into tokens, and outputs tokenized result as a token sequence. In some implementations, the tokenizing module 210 first performs the tokenization based on the dictionary 240, so as to recognize address-related words or segments in an input entry. As an example, the tokenizing module 210 use the Forward Maximum Matching (FMM) method to perform the tokenization based on the dictionary 240. The FMM method selects a string containing several characters (e.g., Chinese characters) as the initial maximum string, and determines whether the initial maximum string matches a term in the dictionary 240. If the initial maximum string does not match any term in the dictionary 240, then the determination of the match is continued by reducing one character from the initial maximum string and determines whether the string containing the rest of the characters matches a term in the dictionary 240, until a matched term is found in the dictionary 240, or the string is reduced to empty. The matched term found in the dictionary 240 and the type associated with the matched term becomes the term and type of a token. Besides the FMM method, other methods, for example, Backward Maximum Matching (BMM) method and Bi-direction Matching (BM) method, may also be used. Some examples for implementing the FMM method, BMM method and BM method can be found in published literature.

The above processing based on the dictionary 240 identifies one or more parts of the input entry that possibly represent a location. In some implementations, the tokenizing module 210 can recognize a number, and tokenize it into a token with the type "Number", even if the particular number is not stored in the dictionary 240 as a term. In some implementations, for the parts of the input entry that are not recognized as address-related information, i.e., the parts of the input entry that do not have a matched term in the dictionary 240, the tokenizing module 210 can segment them into words with these words becoming terms of tokens, and the types of the tokens are annotated as "None". Type "None" indicates that the corresponding term does not belong to any type defined in the dictionary 240, and the corresponding term does not represent address-related information. For example, when tokenizing a Chinese input entry of "城大灯具城" ("Chengda Lamps and Lanterns Market"), the tokenizing module 210 can determine that the Chinese phase "城大" ("Chengda") is not a location name by referring to the dictionary 240 which does not have a dictionary entry for "城大" ("Chengda") as a location name.

The tokens generated by the tokenizing module 210 are associated to statistical scores provided by the statistical model 250 and the parsing module 230 takes into account of the statistical scores in parsing an input entry into the location part and query part. The model training module 220 of the parsing system 200 is provided for training and updating the statistical model 250.

Figure 4:
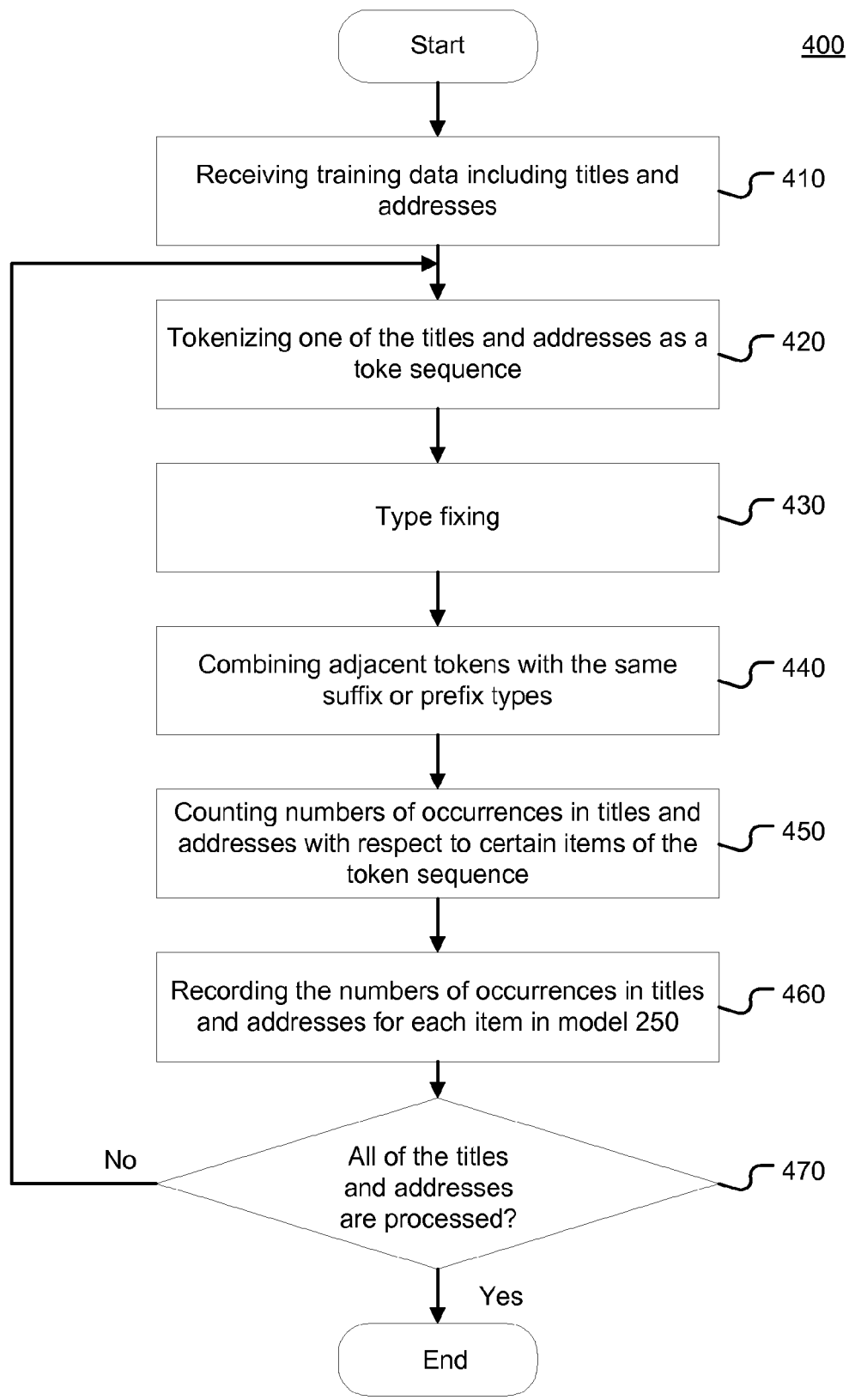
FIG. 4 is a flowchart illustrating an example for training a statistical model.

FIG. 4 is a flowchart illustrating an example of process 400 performed by the model training module 220 for training the statistical model 250.

The model training module 230 obtains training data from one or more sources at step S410. In some implementations, the training data can be obtained from a two-box query log. In applications where the quality of the two-box log is not sufficient for high performance searches, the training data can be obtained from other sources. For example, the training data can be provided by a data provider such as a business entity or a government department. The training data can also be obtained from other sources such as Yellow pages, map databases, etc. Training data includes addresses and titles. A title represents a name of an entity, for example, a business name like "Google", a building name like "科建大厦" (Kejian Building), a name of government office like "北京市政府" (Beijing City Government). Examples of an address include "北京市海淀区中关村大街 29 号" (No. 29 of Zhun Guan Cun Boulevard, Haidian District, Beijing City). In some implementations, originally obtained raw data need to be preprocessed before being used as training data. The preprocessing of raw data is to remove unnecessary parts of the data, e.g., the prefixing name of an administrative region in a title, a trailing title in an address, etc.

For example, if a piece of raw data of a title is "北京市海淀区海淀医院" (Haidian Hospital in Haidian District of Beijing City), then the preprocessing filters it into a pure title "海淀医院" (Haidian Hospital) by removing the prefixing administrative region names "北京市海淀区" (Haidian District of Beijing City). As another example, for a piece of raw data of an address "北京市海淀区 中关村大街 29 号海淀医院" (Haidian Hospital, No. 29 of Zhun Guan Cun Boulevard, Haidian District, Beijing City), the preprocessing filters it into a pure address "北京市海淀区 中关村大街 29 号" (No. 29 of Zhun Guan Cun Boulevard, Haidian Dstrict, Beijing City) by removing the suffixing hospital name "海淀医院" (Haidian Hospital).

At step S420, the model training module 220 transmits one of the titles and addresses in the training data which have been preprocessed to a tokenizing module, e.g., the tokenizing module 210, to perform tokenization, and receives from the tokenizing module a token sequence of tokens with term and type as tokenizing result. Optionally, type fixing is performed at step S430 to fix wrongly annotated types in the token sequence. The type fixing is performed according to some predefined rules. For example, a rule can prescribe that if a term with the type "Quantifier Suffix" does not follow a term with the type "Number", then the type "Quantifier Suffix" is changed into type "None." For example, after tokenizing an address "中关村大街 29 号" (No. 29 of Zhun Guan Cun Boulevard), a term "29" is obtained with the type "Number", and a term "号" (number) is obtained with the type "Quantifier Suffix." Since the term "号" (number) with the type of "Quantifier Suffix" follows the term "29" with the type of "Number", the type of "号" (number) will not be changed. However, after tokenizing a title "中华老字 号东来顺" (China Time-honored Brand Donglaishun), a term "号" may be obtained with the type of "Quantifier Suffix" but the same Chinese character "号" no longer represents a number but rather signifies branding of a business establishment. Hence, the type will be changed to the type "None." Optionally, adjacent tokens whose terms are of the same suffix or prefix types in the token sequence can be combined to a single token, at step S440.

At step S450, the number of occurrences in titles and addresses are counted respectively with respect to types and terms in the token sequence. In some implementations, the counting is performed with respect to certain type sequences and term sequences in the token sequence. In one implementation, the number of occurrences in titles and addresses are counted for the following items:

a term unigram, which is a single term,
   a term bigram, which is a term sequence composed of two adjacent terms,
   a sequence of adjacent terms with type "None",
   a sequence of all terms,
   a type unigram, which is a single type,
   a type bigram, which is a type sequence composed of two adjacent types, and
   the sequence of all types.

For example, when an address "北京朝阳 大屯路" (Beijing, Chaoyang District, Datun Road) is tokenized into a token sequence including several tokens: [Term: 北京 (Beijing), Type: 市 (City)], [Term: 朝阳 (Chaoyang), Type: 区 (District)], and [Term: 大屯路 (Datun Road), Type: Road], the occurrences in addresses for the following items will be counted:

Term unigram: "北京" (Beijing), "朝阳" (Chaoyang), "大屯路" (Datun Road);

Term bigram: "北京朝阳" (Chaoyang of Beijing), "朝阳大屯路" (Datun Road, Chaoyang);

Sequence of all terms: "北京朝阳大屯路" (Datun Road, Chaoyang, Beijing);

Type unigram: "市" (City), "区" (District), "路" (Road);

Type bigram: "市, 区" (Cit, District), "区, 路" (District, Road);

Sequence of all types: "市, 区, 路" (City, District, Road);

The above-mentioned item the sequence of adjacent terms with type "None" is not counted in this example because there is no term with the type "None" in the token sequence [Term: 北京 (Beijing), Type: 市 (City)], [Term: 朝阳 (Chaoyang), Type: 区 (District)], and [Term: 大屯路 (Datun Road), Type: 路 (Road)].

For each counted item, the number of its occurrences in titles and the number of its occurrences in addresses are stored respectively in the model 250, at step S460.

Figure 5:
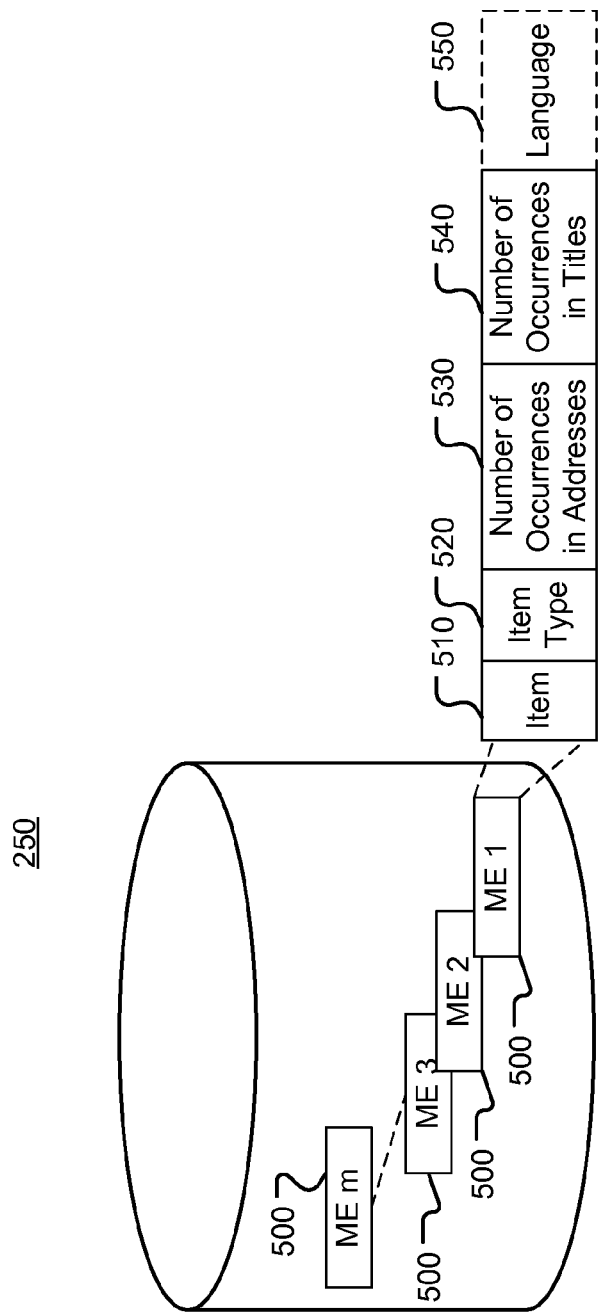
FIG. 5 is a schematic diagram showing an exemplary structure of the model 250 shown in FIG. 2.

FIG. 5 shows an exemplary structure of the model 250. The model 250 includes model entries (MEs) 500. Each counted item has a corresponding model entry in the model 250. In one implementation, a model entry has four fields:

"item" field 510 recording the content of one of the term unigram, type unigram, and term or type sequence including sequence of adjacent terms with type "None", sequence of all terms, type bigram and sequence of all types;

"item type" field 520, recording which type the item is among the item types of term unigram, type unigram, type bigram, term bigram, sequence of adjacent terms with type "None", sequence of all terms, and sequence of all types;

"number of occurrences in titles" field 530, which records how many times the corresponding item occurs in titles; and "number of occurrences in addresses" field 540, which records how many times the corresponding item occurs in addresses.

In some implementations, a model entry can also have a fifth field of "language" field 550 indicating the language of the item.

Consider an example where an item "朝阳大屯路" (Chaoyang Datun Road) for the address "北京朝阳大屯路" (Beijing Chaoyang Datun Road) is counted at step S450. If there is no existing model entry whose "item" field, "item type" field, and "language" field, if exists, all match the item "朝阳大屯路", an model entry for "朝阳大 屯路" (Chaoyang Datun Road) is created with the "item" field valued as "朝阳大屯路", the "item type" field valued as "Term Bigram", the "number of occurrences in titles" field valued as 0, the "number of occurrences in addresses" field valued as 1, and the "language" field valued as "Chinese."

When there is already an existing model entry whose "item" field, "item type" field and "language" field all match the item "朝阳大屯路" (Chaoyang Datun Road), the value of the "number of occurrences in addresses" field of the model entry is incremented by 1, and the values of other fields of the model entry remain unchanged. As a specific example, consider another example where an item "市, 区, 路" (City, District, Road), whose type is "sequence all types", is counted for the address "北京朝阳大屯路" (Beijing Chaoyang Datun Road). If there is an existing model entry whose "item" field is "市, 区, 路" (City, District, Road), "item type" field is "Sequence of All Types", and "language" field is "Chinese", that is, there is an existing entry whose "item" field, "item type" field and "language" field all match the item "市, 区, 路" (City, District, Road), then the values of "number of occurrences in titles" and "Language" fields of the model entry remain unchanged, and the value of "number of occurrences in addresses" field of the model entry is incremented by 1.

At step 470, the training model checks whether all the titles and addresses are processed. If all the titles and addresses are processed, the process 400 for training a statistical model 250 is completed, and a statistical model 250 is generated or updated for use by the parsing module 230 in parsing an input entry from a user query. Otherwise, process 400 goes back to the step S420 to process the next title or address.

The training of the statistical model 250 by the model training module 220 can be implemented in various ways. In one implementation, for example, the model training module 220 trains the statistical model 250 at the beginning of the operation of system 200, and updates the statistical model 250 on a periodic basis or when certain events happen, for example, when the training data is updated.

The statistical model 250 generated by the model training module 220 can be used by the parsing module 230 to determine a location statistical score and a query statistical score for an item, a token or a token sequence. The "item" here indicates the item for which the numbers of occurrences in titles and address are counted, i.e., term unigram, term bigram, sequence of adjacent terms with type "None", sequence of all terms, type unigram, type bigram, or sequence of all types. The location statistical score of an item, a token or a token sequence indicates a probability that the item, the token or the token sequence relates to location. The query statistical score of an item, a token or a token sequence indicates a probability that the item, the token or the token sequence relates to a query, i.e., to an entity name or an entity category.

In some implementations, if an item has a corresponding entry in the statistical model 250, the location statistical score and query statistical score of the item are calculated by using Equations (1) and (2), respectively:

$$\text{location statistical score of an item} = \log(l\_count) * l\_count/(l\_count + q\_count) \quad \text{Equation (1)};$$

$$\text{query statistical score of an item} = \log(q\_count) * q\_count/(l\_count + q\_count) \quad \text{Equation (2)},$$

wherein l_count and q_count represent the numbers of occurrences of the item in addresses and titles, respectively, which are stored in the statistical model 250. For example, when computing the location and query statistical scores of an item of term unigram "朝阳" (Chaoyang), if the numbers of occurrences of the term unigram "朝阳" (Chaoyang) in addresses and titles are N1 and N2, respectively, the location statistical score of the item is calculated as logN1*N1/(N1+N2), and the query statistical score of the item is calculated as logN2*N2/(N1+N2). If an item does not have a corresponding entry in the statistical model 250, the location statistical score and query statistical score of the item are given a value of "0."

In some implementations, a location statistical score of a token is defined as the sum of the location statistical score of the term (term unigram) of the token and the location statistical score of the type (type unigram) of the token.

Exemplary methods for computing a location statistical score and a query statistical score for a token sequence based on the statistical model 250 are described below.

Figure 7A:
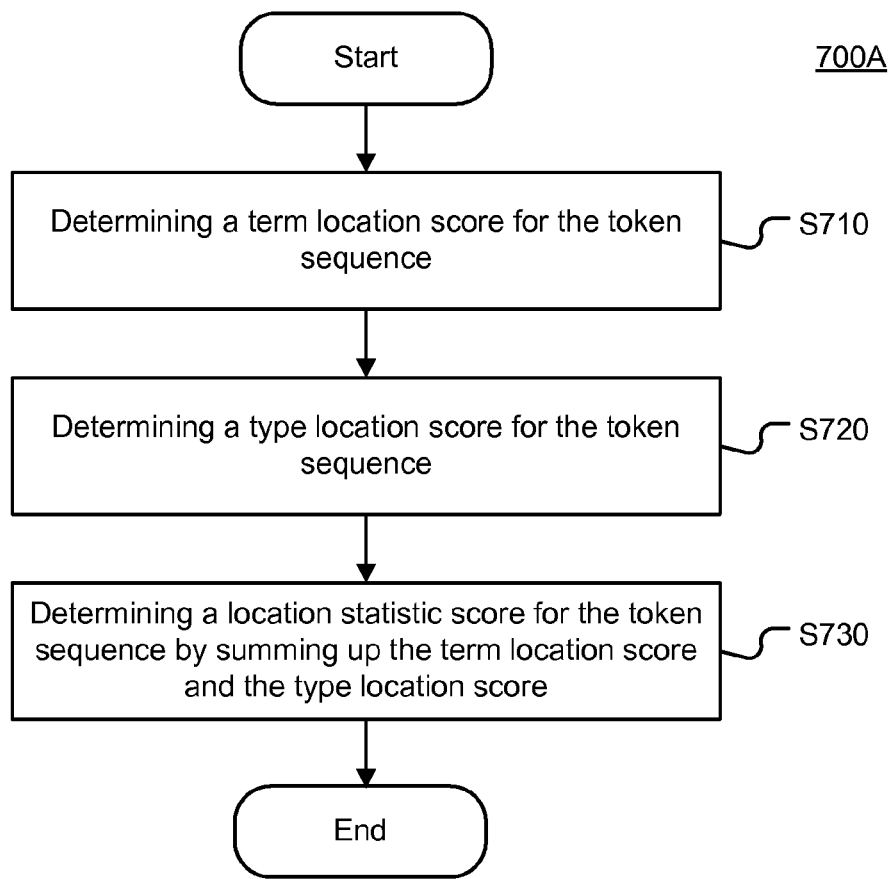
FIG. 7A illustrates an exemplary process of computing a location statistical score for a token sequence.
Figure 7B:
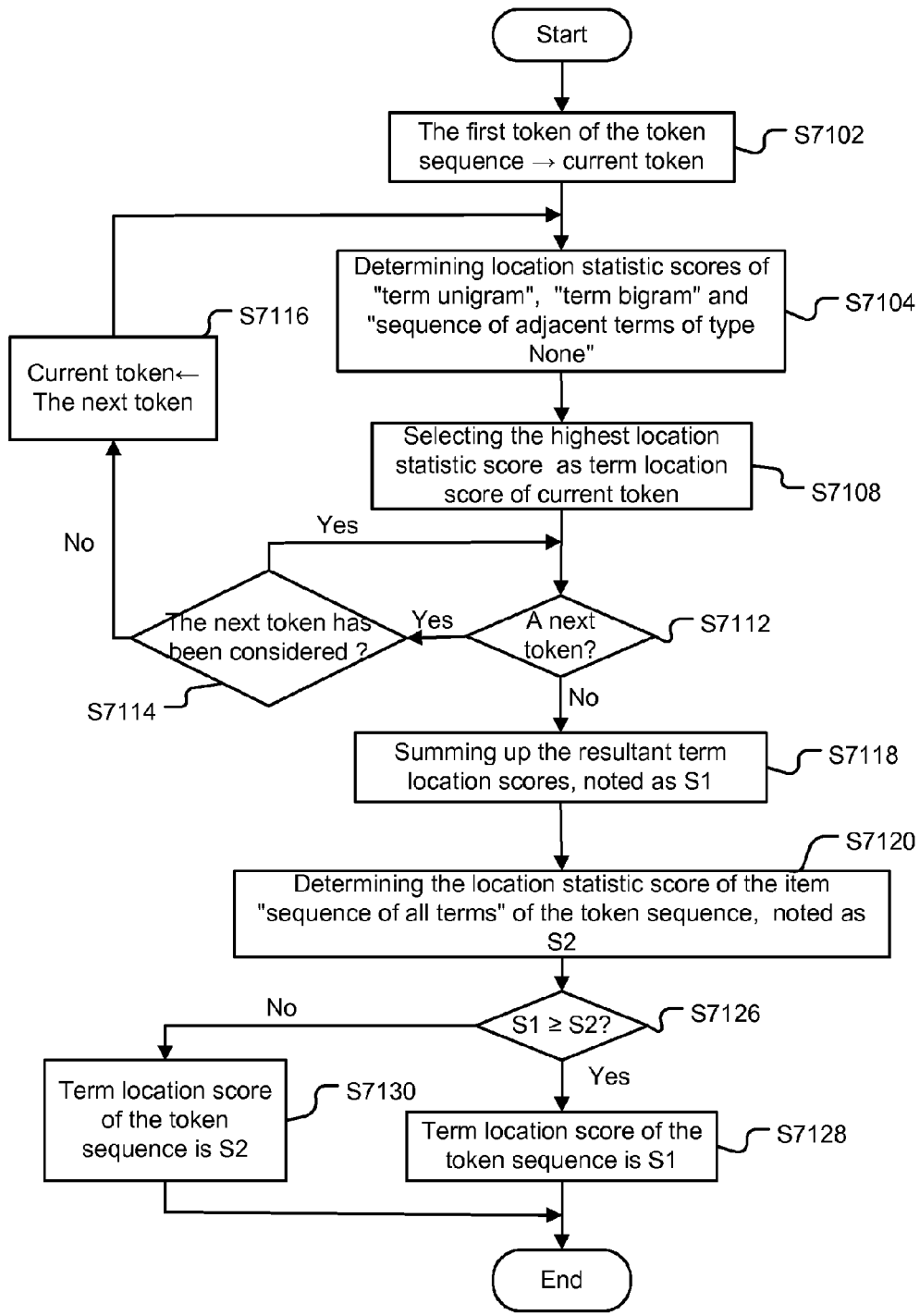
FIG. 7B illustrates an exemplary process of determining a term location score of a token sequence.
Figure 7C:
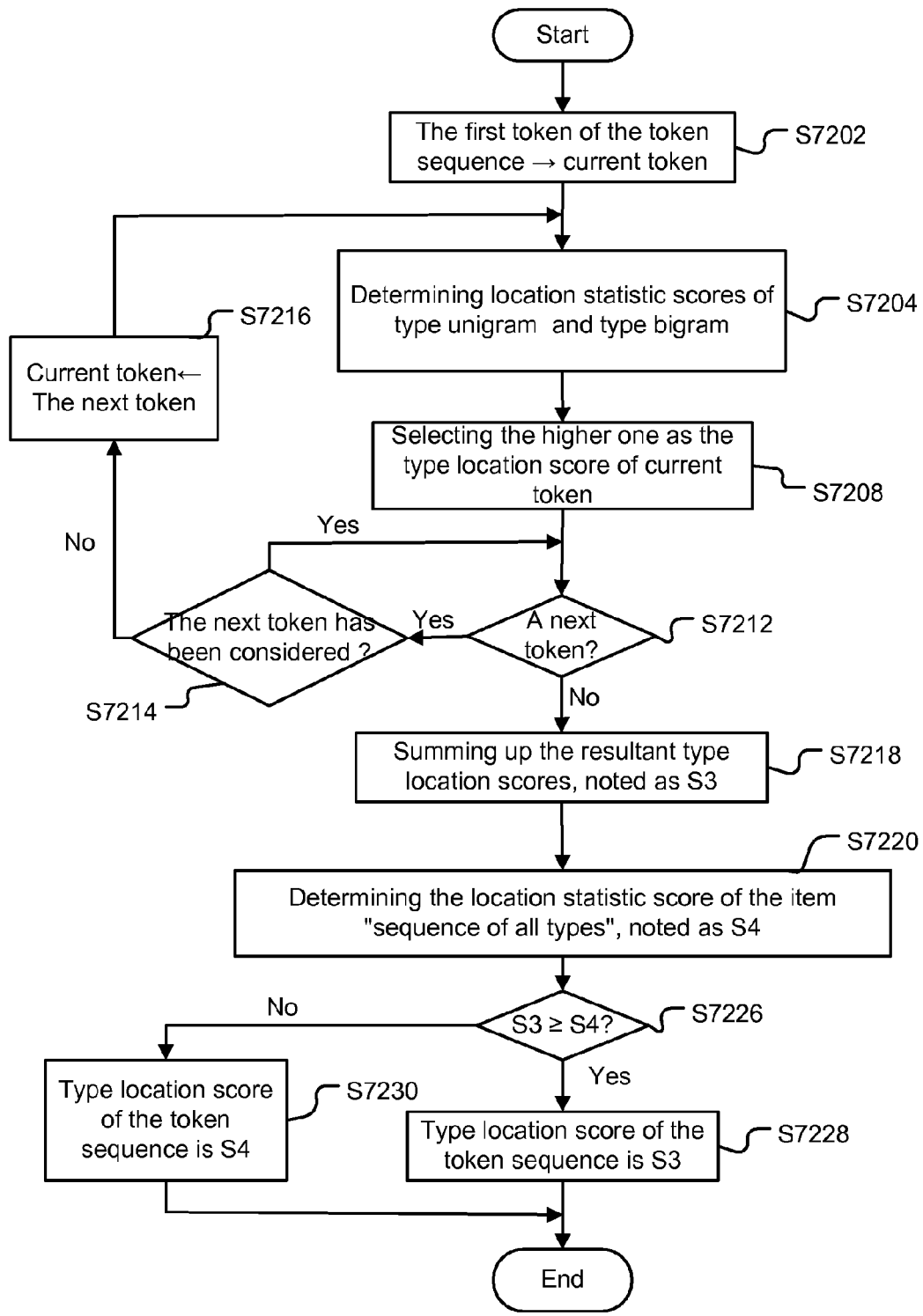
FIG. 7C illustrates an exemplary process of determining a type location score of a token sequence.

FIG. 7A illustrates an exemplary process 700A of computing a location statistical score for a token sequence. At step S710, a term location score is determined for the token sequence. The term location score is a statistical score determined based on the location statistical scores of items regarding terms of the token sequence. The process of determining a term location score of a token sequence in one implementation is illustrated in FIG. 7B and is described below. At step S720, a type location score is determined for the token sequence. The type location score is a statistical score determined based on the location statistical scores of items regarding types of the token sequence. The process of determining a type location score of a token sequence in one implementation is illustrated in FIG. 7C and is described below. At step S730, the location statistical score of the token sequence is determined by summing up the term location score and the type location score of the token sequence.

FIG. 7B shows an exemplary process 700B of determining a term location score of a token sequence. At step S7102, defining the first token in the token sequence as a current token. At step S7104, determining the location statistical scores for the following items of the token sequence by referring to the statistical model 250: the "term unigram" of the current token, and "term bigram" and "sequence of adjacent terms with type 'None'" that begin with the term of the current token, if such items exist. At step S7108, the highest one among the location statistical scores determined in step S7104 is selected as a term location score of the current token. At step S7112, determining whether there is a next token in the token sequence, and if result of this determination is Yes (Yes in step S7112), determining whether the next token has been considered when determining the term location score of the current token at step S7114. If the next token has been considered (Yes in step S7114), the considered token is skipped, and the process 700B goes on with step S7112, otherwise (No in step S7114), if the next token is not considered when determining the term location score of the current token, the next token is defined as the current token (step S7116), and the process 700B returns to step S7104. At step S7112, if it is determined that there isn't a next token in the token sequence (No in step S7112), the process 700B goes to step S7118 to sum up the resultant term location scores of tokens as score S1. Next, the location statistical score of the item "sequence of all terms" of the token sequence (noted as score S2) is determined by referring to the statistical model 250 at step S7120. At step S7126, comparing the scores S1 and S2, and the term location score of the token sequence is determined as score S1 (step S7128) if score S1 is equal to or greater than score S2 (Yes in step S7126), otherwise, if score S1 is less than score S2 (No in step S7126), the term location score of the token sequence is determined as score S2 (step S7130), then the process 700B is completed.

Next, an exemplary process 700C of determining a type location score of a token sequence is described by referring to FIG. 7C. At step S7202, defining the first token in the token sequence as a current token. At step S7204, determining the location statistical scores for the following items of the token sequence by referring to the statistical model 250: the "type unigram" of the current token, and, if exists, the "type bigram" which begins with the type of the current token. At step S7208, the higher location statistical score determined in step S7204 is selected as the type location score of the current token. When the current token is the last token in the token sequence, the "type bigram" which begins with the type of the current token does not exist, of course, and the type location of this current token is the location statistical score of "type unigram". At step S7212, determining whether there is a next token in the token sequence, and if the result of determination is Yes (Yes in step S7212), determining whether the next token has been considered when determining the type location score of the current token at step S7214. If the next token has been considered (Yes in step S7214), the considered token is skipped, and the process 700C goes on with step S7212, otherwise, if the next token is not considered when determining the type location score of the current token (No in step S7214), the next token is defined as the current token (step S7216), and the process 700C returns to step S7204. At step S7212, if it is determined that there is not a next token in the token sequence (No in step S7212), the process goes to step S7218 to sum up the resultant type location scores of tokens, and the result is noted as score S3. Next, determining the location statistical score of the item "sequence of all types" of the token sequence (this score is noted as score S4) by referring to the statistical model 250 at step S7220. At step S7226, comparing the scores S3 and S4, and the type location score of the token sequence is determined as score S3 (step S7228) if score S3 is equal to or greater than score S4 (Yes in step S7226), otherwise, if score S3 is less than score S4 (No in step S7226), the type location score of the token sequence is determined as score S4 (step S7230). Then the process 700C is completed.

Figure 8A:
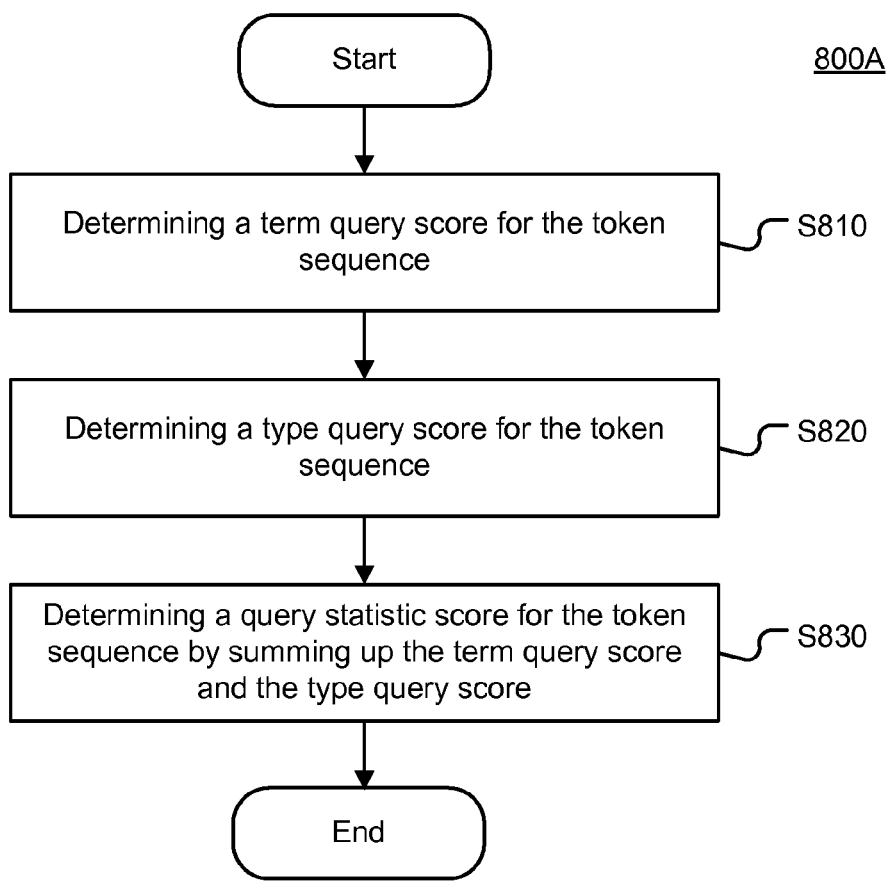
FIG. 8A illustrates an exemplary process of computing a query statistical score for a token sequence.

The query statistical score of a token sequence can be determined similarly to the location statistical score. FIG. 8A illustrates an exemplary process 800A of computing a query statistical score for a token sequence. The query statistical score of a token sequence can be determined by summing up a term query score and a type query score of the token sequence, wherein the term query score is a statistical score determined based on the query statistical scores of items regarding terms of the token sequence, and the type query score is a statistical score determined based on the query statistical scores of items regarding types of the token sequence.

Figure 8B:
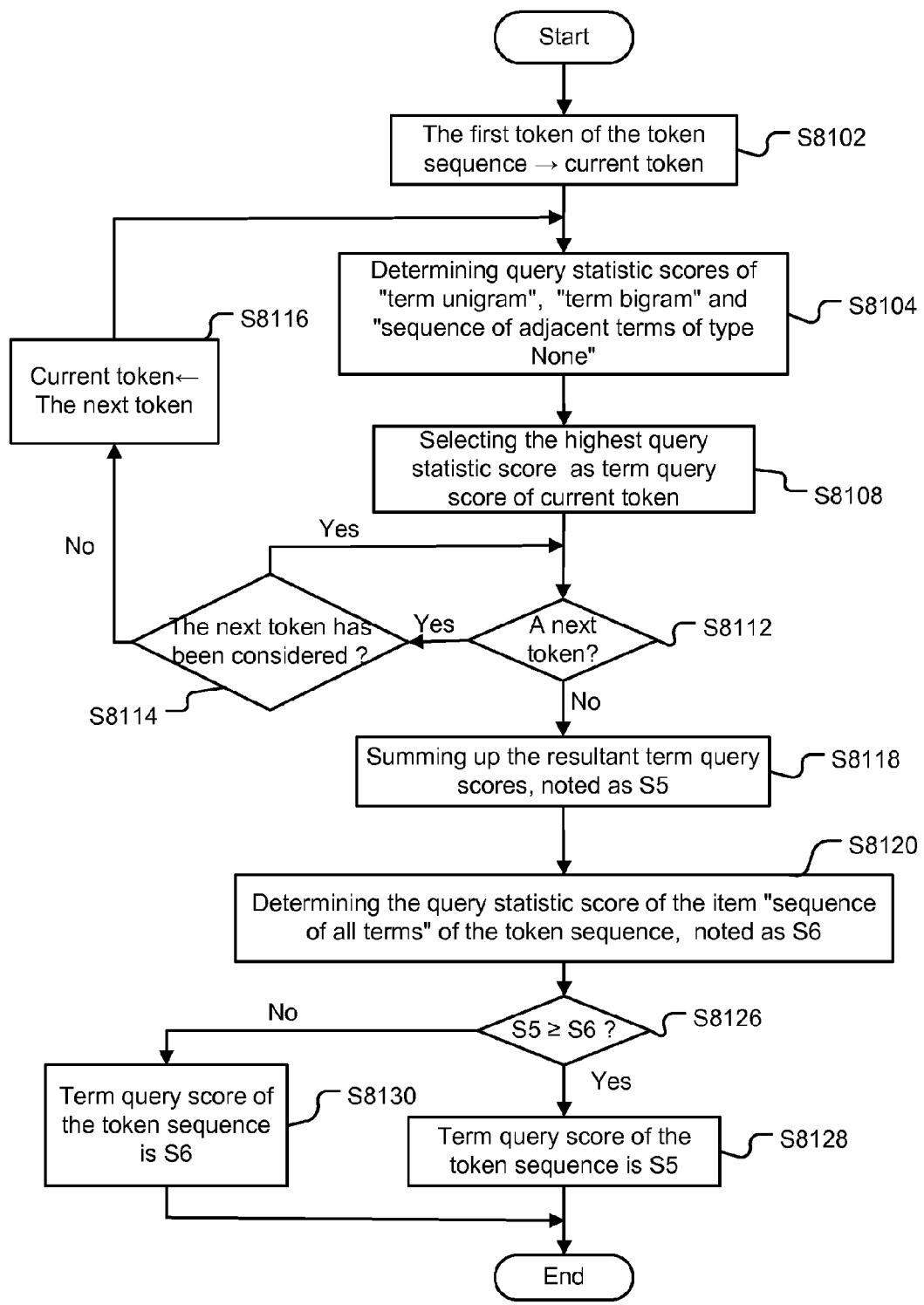
FIG. 8B illustrates an exemplary process of determining a term query score of a token sequence.
Figure 8C:
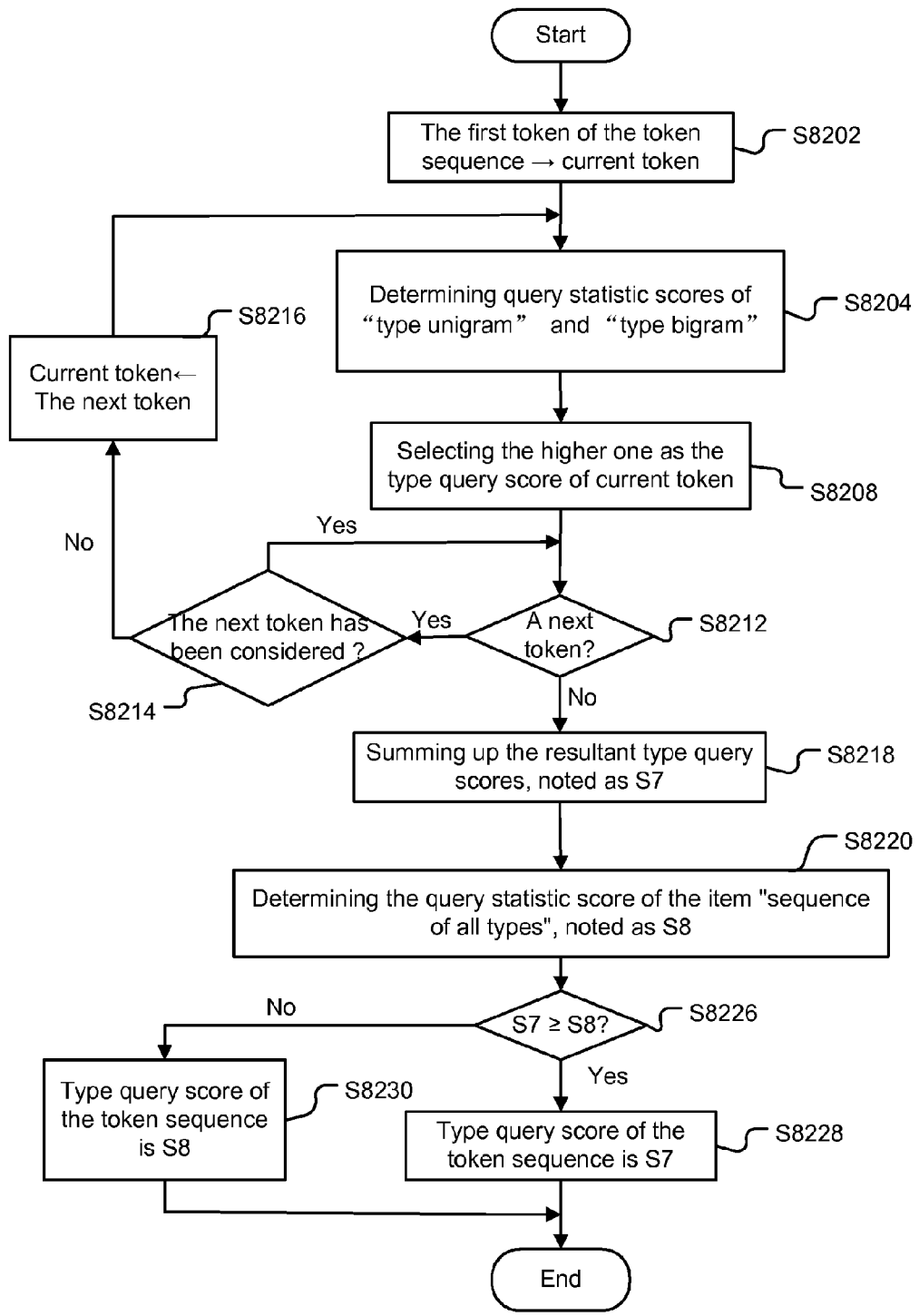
FIG. 8C illustrates an exemplary process of determining a type query score of a token sequence.

FIG. 8B illustrates an exemplary process 800B of computing a term query score of a token sequence, and FIG. 8C illustrates an exemplary process of computing a type query score of a token sequence. Detailed operations of FIGS. 8A-8C can be understood by referring to the relevant description for FIGS. 7A-7C.

The following is an example of determining the query statistical score of an input token sequence which has three tokens as follows:

Term: 北京 (Beijing), Type: 市 (City),
Term: 朝阳 (Chaoyang), Type: 区 (District);
Term: 大屯路 (Datun Road), Type: 路 (Road).

First the term query score of the token sequence is calculated. The calculation starts with defining the first token "北京 (Beijing), Type: 市 (City)" as the current token, and determining the term query score of the current token: determining the query statistical scores of term unigram "北京" (Beijing) of the current token and the term bigram "北京朝阳" (Beijing Chaoyang) which begins with the term of the current token by referring to the statistical model 250, comparing the two resultant query statistical scores and selecting the higher one, for example, the query statistical score of "北京朝阳" (Beijing Chaoyang), as the term query score of the current token, noted as score ST1. Then the token "Term: 朝阳 (Chaoyan), Type: District" is skipped since the term of this token has been considered when determining the term query score of the current token with the term "北京" (Beijing) The next token is "Term: 大屯路 (Datun Road), Type: 路 (Road)", which is not considered when determining the term query score of the current token, so the token "Term: 大屯路 (Datun Road), Type: 路 (Road)" is defined as the current token, and the term query score of this current token is determined as the query statistical score of the unigram term stored in the model, noted as score ST2. The score ST1 is summed up with the score ST2, and the result is compared with the query statistical score of the whole term sequence (sequence of all terms) "北京朝阳大屯路" (Beijing Chaoyang Datun Road), the higher one is selected as the term query score of the token sequence.

Next, the type query score of the input token sequence is calculated. As mentioned above, the first token in the token sequence "Term: 北京, Type: City" is defined as the current token, and the calculation of the type query score of the input token sequence starts with determining the type query score of the current token "北京 (Beijing), Type: 市 (City)": determining the query statistical scores of type unigram "City" and type bigram "City District" which is started with the type of the current token by referring to the model 250, comparing the obtained query statistical scores and selecting the higher one, for example, the query statistical score of "City", as the type query score of the first token, noted as score ST3. Then the next token "Term: 朝阳 (Chaoyang), Type: 区 (District)" is defined as the current token, and query statistical scores of type unigram "District" and type bigram "District Road" are determined by referring to the statistical model 250, and the higher one, for example, the query statistical score of the type bigram "District Road", is selected as the type query score of the second token, noted as score ST4. The third token is skipped because it has been considered when determining the type query score of the previous token "Term: 朝阳 (Chaoyang), Type: 区 (District)". The score ST3 is summed up with the score ST4, and the result is compared with the query statistical score of the whole type sequence (sequence of all types) "City District Road", the higher one is selected as the type query score of the token sequence.

At this time, the term query score and the type query score of the token sequence are added together, and the result is the query statistical score of the token sequence.

Figure 6A:
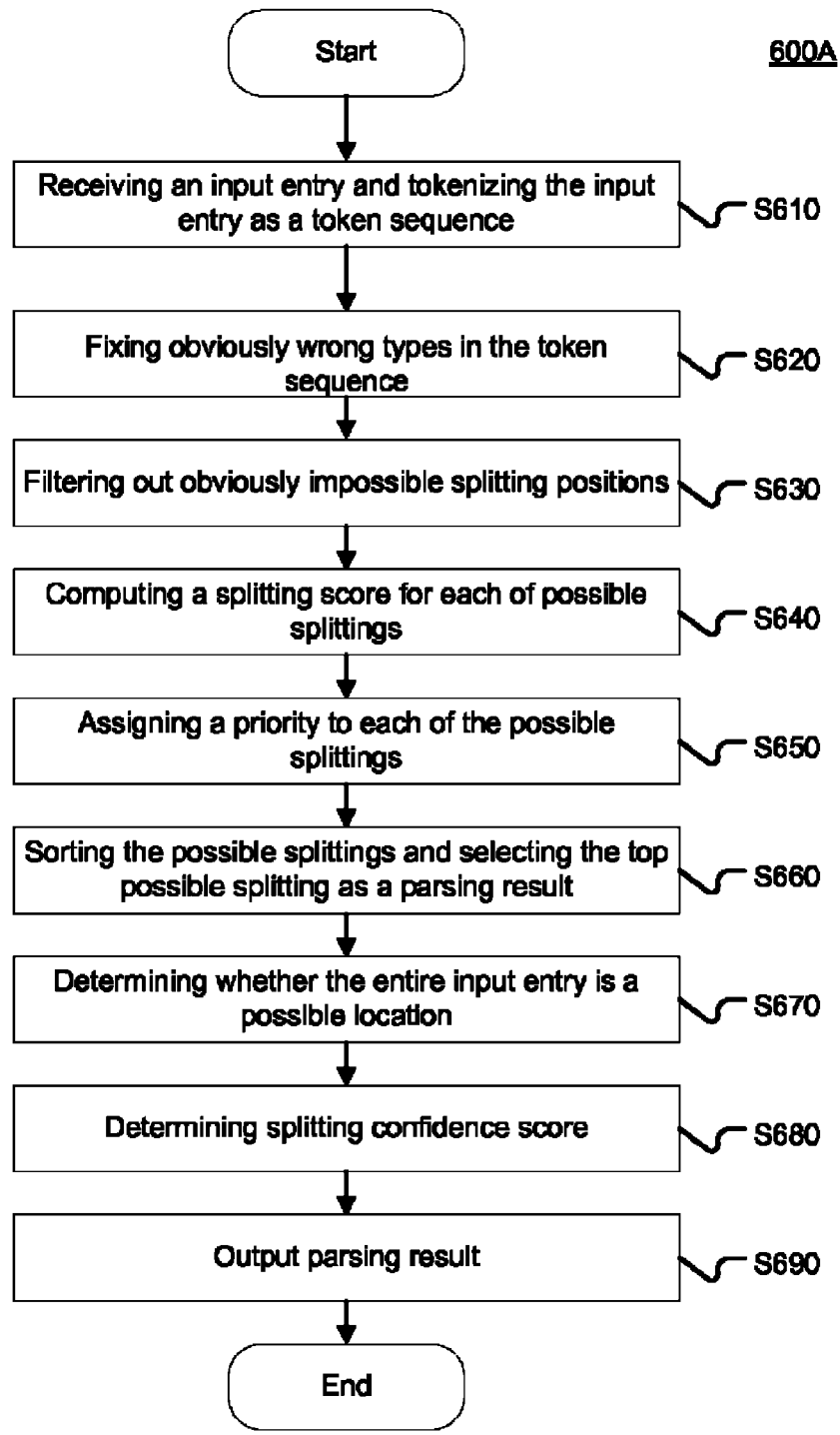
FIG. 6A is a flowchart illustrating an exemplary process of parsing an input entry.

Referring back to FIG. 2, the parsing module 230 of system 200 parses an input entry into a location part and a query part. FIG. 6A is a flowchart illustrating an exemplary process 600A for parsing an input entry by the parsing module 230.

At step S610, an input entry is received and tokenized, for example, by using the tokenizing module 210, and a token sequence is obtained. An input entry is tokenized into a sequence of tokens annotated with types. As mentioned above, the input entry can be input by a user at a client terminal 210 and transmitted to the parsing module 230 via network 230.

Optionally, at step S620, a post-process can be performed to fix obviously wrong types in the token sequence using predefined type fixing rules. A type fixing rule is for fixing an obviously wrong type annotated to a token. In implementations, a rule can be defined by two parts: a condition and a target action or value. If the condition is satisfied, the target action is performed or a target value is returned. For example, a type fixing rule can prescribe that if a token with the type "Quantifier Suffix" does not follow a token with the type "Number", then the type "Quantifier Suffix" is changed into type "None." As mentioned in a previous example, the initially annotated type "Quantifier Suffix" of a term "号" of a title "中华老字号东来顺" (China Time-honored Brand Donglaishun) is changed to the type "None" because the term "号", although using the same Chinese character for "number," the term "号" signifies the branding of the business and is used in a combination with a term "老字" (Laozi) to mean "Time-honored Brand."

At step S630, for every position between two adjacent tokens in the token sequence, deciding whether it could be a possible position of splitting, for example, by using predefined no splitting rules, and filtering out the position if it is obviously an impossible position. A no splitting rule is for prescribing a position that should not be the position of splitting. For example, a no splitting rule can prescribe that the position between a token with the type of "Street" and a token with the type of "Number" should not be the position of splitting. The operation of filtering out obviously wrong splitting positions can reduce the effects of noises in the statistical model 250.

At step S640, a splitting score is computed for each possible splitting manner. The splitting score indicates a statistical probability of correctness of the possible splitting manner. A splitting manner is defined by a query part and a location part. Each possible splitting manner corresponds to one possible splitting position. A possible splitting position can be a position between two adjacent tokens in the token sequence, which divides the token sequence into two parts. A possible splitting position can also be a position before the first token or after the last token of the token sequence, which "divides" the token sequence into one sub-token sequence. More specifically, as for a possible splitting position which is between two adjacent tokens in the token sequence and divides a token sequence into two parts, i.e., two sub-token sequences, a query statistical score and a location statistical score are determined for each of the two sub-token sequences by using, for example, the processes illustrated in FIGS. 7A-7C and FIGS. 8A-8C. A location statistical score of a sub-token sequence indicates the probability that the sub-token sequence is a location part, and a query statistical score of a sub-token sequence indicates the probability that the sub-token sequence is a query part. Between the two sub-token sequences divided by a possible splitting position, the one which has a higher location statistical score is regarded as a possible location part of the input entry, and the other one is regarded as a possible query part of the input entry. The score of a corresponding possible splitting is determined based on the location statistical score of the location part of the splitting and the query statistical score of the query part of the splitting. As an example, the score of the splitting is determined by summing up the location statistical score of the possible location part and the query statistical score of the possible query part. Furthermore, as for the possible splitting position which divides the token sequence into one sub-token sequence, a location statistical score and a query statistical score is determined for the entire token sequence. The possible splitting manner corresponding to this position is determined by regarding the entire token sequence as a location part, and the splitting score is determined as the location statistical score of the entire token sequence, if the location statistical score of the entire token sequence is higher than the query statistical score of the entire token sequence. Similarly, the possible splitting manner corresponding to the position which divides the token sequence into one sub-token sequence is determined by regarding the entire token sequence as a query part, and the splitting score is determined as the query statistical score of the entire token sequence, if the query statistical score of the entire token sequence is higher than the location statistical score of the entire token sequence.

Optionally, two multipliers including a query multiplier for the query part and a location multiplier for the location part can be determined for adjusting the query statistical score of the query part and the location statistical score of the location part. A possible splitting can be excluded if either one of its query multiplier and location multiplier is zero. The multipliers can be determined as follows. First, two base multipliers including a base query multiplier for the query part and a base location multiplier for the location part are determined. In one implementation, the base multipliers are predefined as predetermined values. In another implementation, the base multipliers are determined based on the items and lengths of the two parts. The base multipliers can be used as query multiplier and location multiplier directly. Alternatively, the location base multiplier can be adjusted by promotion or demotion, and the adjusted location base multiplier is used as location multiplier. For example, if the token sequence of the location part contains address components in hierarchy order, such as [province+city+district+street], then the location multiplier can be promoted. The length of the hierarchy administrative address (such as city, district) and the length of the hierarchy normal address (such as street, building) can be computed, and a weighted value can be added to the location base multiplier. As another example, if the token sequence of the location part contains address components that are not in hierarchy order, then the location base multiplier is demoted. As yet another example, if there are duplicate address components in the token sequence, such as "北京市 北京", then the location base multiplier is demoted. After the determination of the query and location multipliers, the query statistical score of the query part and the location statistical score of the location part are adjusted using the determined query and location multipliers. Specifically, the query statistical score of the query part is multiplied by the query multiplier, and the location statistical score of the location part is multiplied by the location multiplier. The score of the splitting can be determined by summing up the adjusted query and location statistical scores.

Optionally, at step S650, a priority is assigned to each of the possible splittings. Two levels of priorities may be used and can be represented by two digits 1 and 0, wherein 1 is a higher priority and 0 is a lower priority. The priority can be assigned as follows. For example, as for a splitting corresponding to a splitting position between two adjacent tokens in a token sequence, if the splitting is split by a separator such as a space, a comma, etc., the priority of the splitting is 1. Otherwise, if the splitting is not split by a separator, the priority of the splitting is 0. For a splitting that the entire token sequence is a query part or a location part, if the input entry contains a separator, then the priority of the splitting is 1, otherwise the priority of the splitting is 0.

At step S660, the possible splittings are sorted, and the top possible splitting is selected as a parsing result. In one implementation, the possible splittings are sorted by splitting scores. In another implementation that a priority is assigned to each of the possible splittings, the possible splittings can be sorted first by priorities then by scores. As mentioned above, a resultant splitting is represented by its query part and location part.

Optionally, at step S670, it is determined whether the entire input entry is a possible location. An input entry is determined to be a possible location if it satisfies any of the following conditions: 1), the input entry satisfies some certain conditions, for example, the input entry is ended with a number; and 2), the whole location splitting (i.e. the entire token sequence is a location part) is the splitting with the second highest score and the ratio of its score to the highest splitting score is higher than a predetermined threshold. If the entire input entry is determined to be a possible location, the splitting that the entire input entry is the location part is regarded as an additional resultant splitting which can be output as a reference.

Optionally, at step S680, a splitting confidence score is determined for each of the resultant splitting(s). The splitting confidence score indicates the confidence in the correctness of the splitting. In one implementation, the splitting confidence score is defined as follows. First, a query confidence score and a location confidence score for an item (including term unigram, term bigram, sequence of adjacent terms of type None, sequence of all terms, type unigram, type bigram, sequence of all types) are defined by Equations (3) and (4):

$$\text{query\_conf} = \text{query\_score}/(\text{query\_score} + \text{location\_score}) \quad \text{Equation (3)}$$

$$\text{location\_conf} = \text{location\_score}/(\text{query\_score} + \text{location\_score}) \quad \text{Equation (4)}$$

wherein, the query_conf and the location_conf are respectively the query confidence score and location confidence score of an item, and the query_score and the location_score are respectively the query statistical score and location statistical score of the item. Second, a query confidence score for a query part of a splitting is defined as the average of the query confidence scores of the items which are used to determine the term query score of the query part (FIG. 8B), and a location confidence score for a location part of the splitting is defined as the average of the location confidence scores of the items which are used to determine the term location confidence score of the location part (FIG. 7B). The splitting confidence score of a splitting is defined as an average of a location confidence score of the location part of the splitting and a query confidence score of the query part of the splitting. As an example, a splitting confidence score has a value in the range of [0, 1], and the higher the splitting confidence score is, the more confidence there is in the correctness of the splitting. The splitting confidence score is also an additional parsing result that can be output by the parsing module 230 as a reference.

Referring to FIG. 6A, at step S690, parsing result is output by the parsing module 230. The parsing result includes the resultant splitting obtained at step S660. In the exemplary process 600A, the parsing result also includes the additional results obtained at steps S670 and S680, which can be used as references by the users of the system 200. The users of the system 200 include modules, components or systems which use the results of the system 200. For example, the map search system 140 is one of the users of the system 200.

Figure 6B:
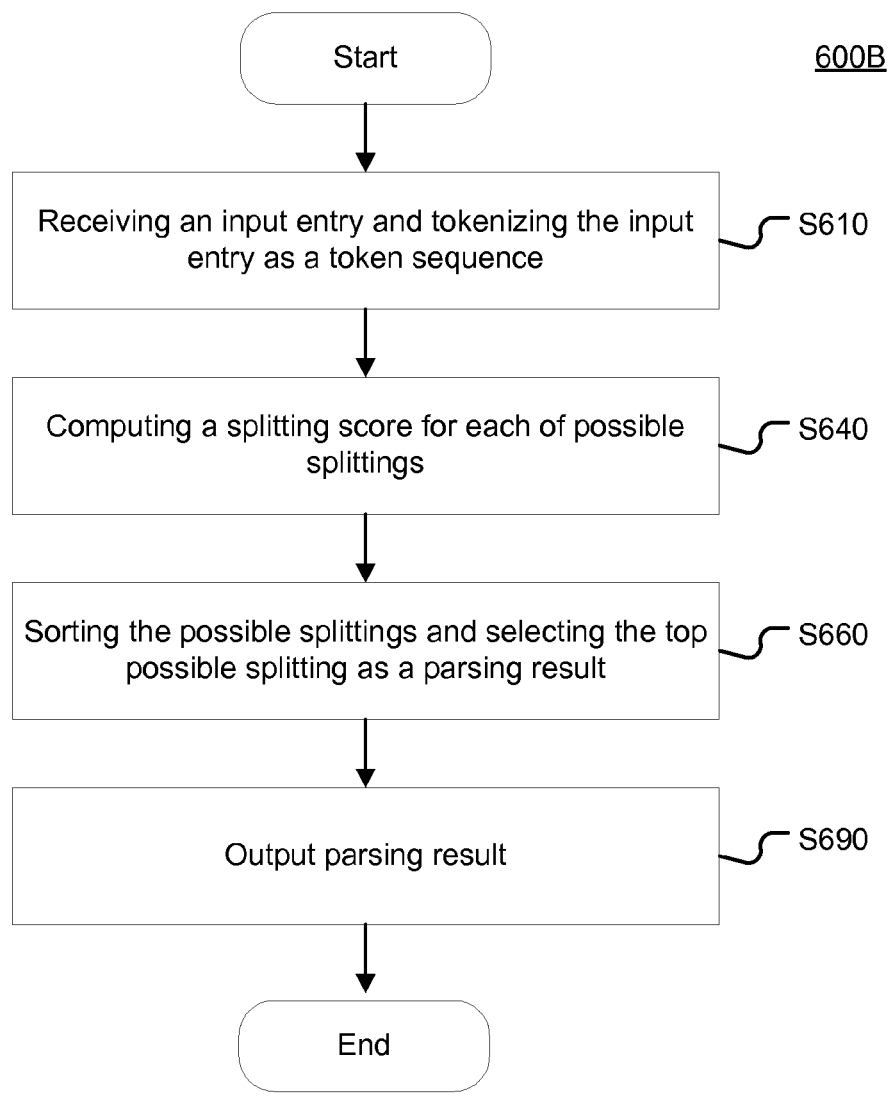
FIG. 6B is a flowchart illustrating another exemplary process of parsing an input entry.

Various processing operations in the above process in FIG. 6A can be implemented by alternative processings. FIG. 6B is a flowchart illustrating another exemplary process 600B for parsing an input entry by the parsing module 230. The processing steps S610, S640, S660 and S690 in process 600B are substantially the same as those steps with identical reference numbers in process 600A of FIG. 6A.

Having described various features of the parsing system 200 in FIG. 2 for parsing an input entry into a location part and a query part for map search with respect to FIGS. 2-8C, the following sections describe the map search based on the output of the parsing system 200. In the example of FIG. 1, the map search is performed by the parsing system 200 and the map search system 140 at a server 120.

Figure 9:
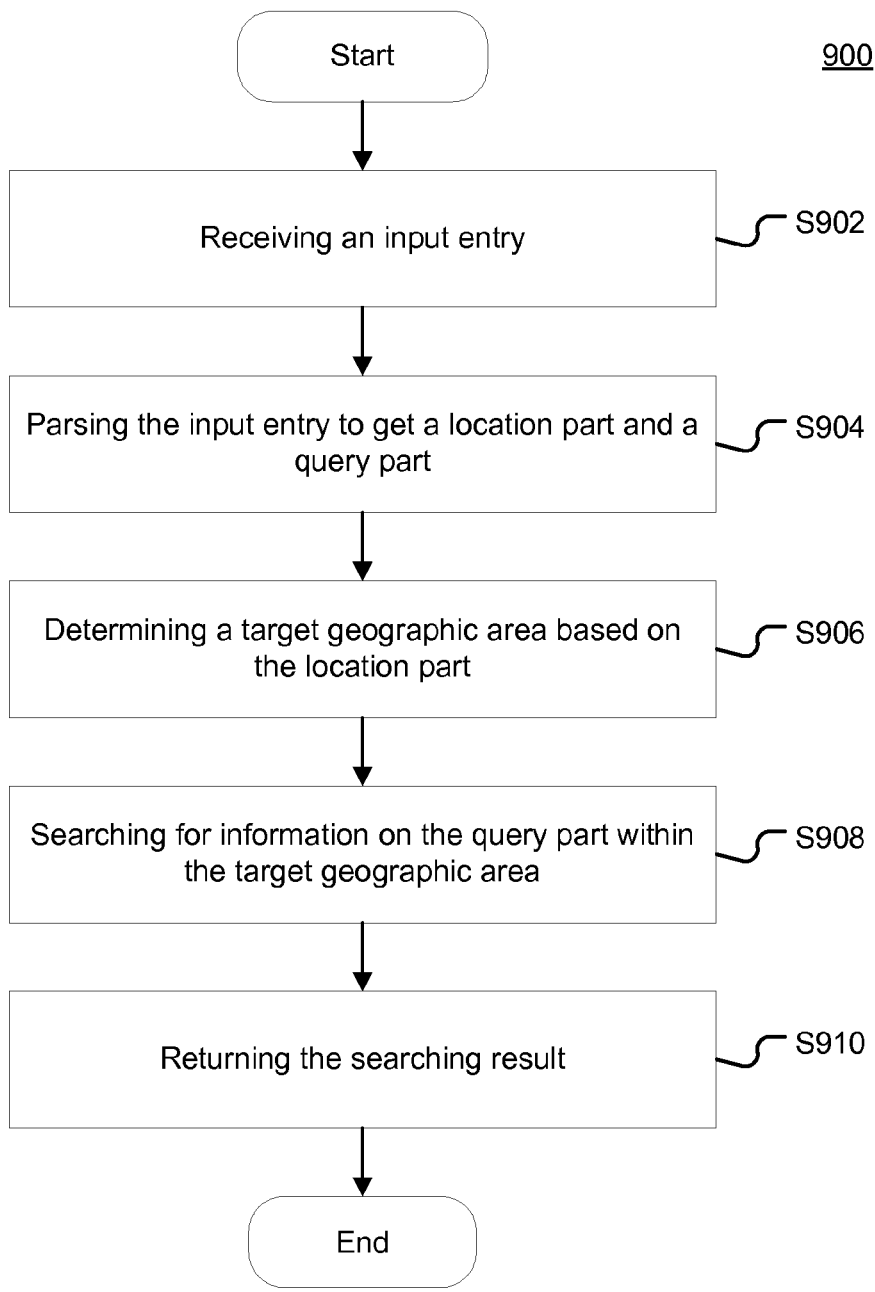
FIG. 9 is a flowchart illustrating an exemplary process of performing map search.

FIG. 9 is a flowchart illustrating an exemplary process of performing map search. At step S902, an input entry is received by the parsing system 200. The input entry can be input into a map search interface by a user at a client 110, and transmitted to the parsing system 200 via the network 130. At step S904, the input entry is parsed by the parsing system 200, and parsing result, including at least one of a location part and a query part, are forwarded to the map search system 140. The map search system 140 performs map search based on or by referring to the parsing result. In some implementations, the map search system 140 determines a target geographic area based on the location part at step S906. For example, the map search system 140 may geocode the location part to get the target geographic area. The target geographic area can be defined by longitudes and latitudes. At step S908, the map search system 140 searches for information on the target or targets represented by the query part within the target geographic area, and the search results are returned, for example, to the client 110 and presented to the user at step S910.

Figure 10:
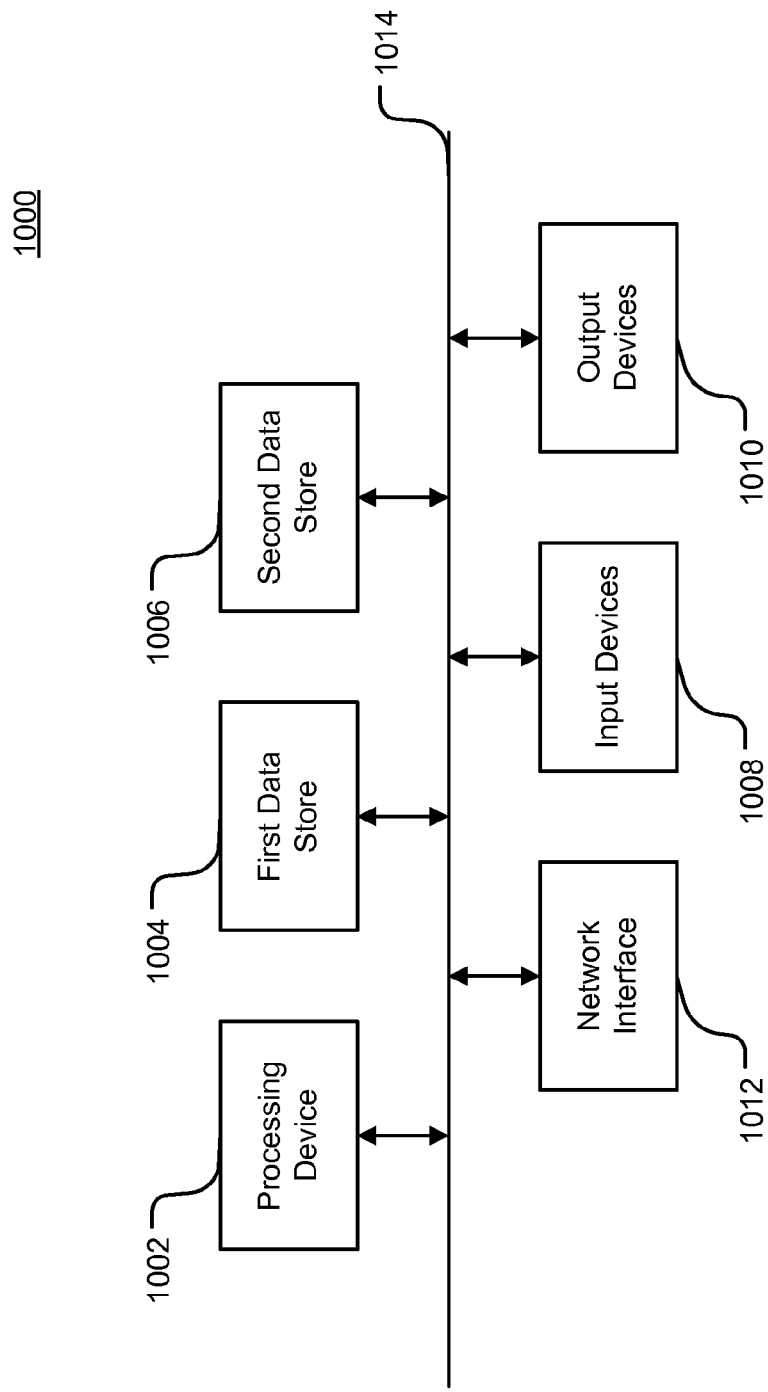
FIG. 10 is a block diagram of an exemplary device 1000 for implementing techniques described in this document.

FIG. 10 is a block diagram of an exemplary device 1000 that can be utilized to implement the systems and methods of map search described in this document. The device 1000 includes a processing device 1002, a first data store 1004, a second data store 1006, input devices 1008, output devices 1010, and a network interface 1012. A bus system 1014, including, for example, a data bus and a motherboard, can be used to establish and control data communication between the components 1002, 1004, 1006, 1008, 1010 and 1012. Other exemplary system architectures can also be used.

The processing device 1002 includes, e.g., one or more microprocessors. The first data store 1004 includes, e.g., a random access memory (RAM) storage device, such as a dynamic random access memory (DRAM), or other types of computer-readable medium memory devices. The second data store 1006 includes, e.g., one or more hard drives, a flash memory, and/or a read only memory (ROM), or other types of computer-readable medium memory devices.

In some implementations, the device 1000 includes codes in a data store, such as the second data store 1006. The codes can be defined by instructions that upon execution cause the processing device 1002 to carry out the functions of the parsing system 200 and/or the map search system 140. A data store, such as the second data store 1006, can store the dictionary 240 and/or the statistical model 250.

Exemplary input devices 1008 include a keyboard, a mouse, a stylus, etc., and exemplary output devices 1010 include a display device, an audio device, etc. In some implementations, the input devices 1008 receive training data for training the statistical model 250. The network interface 1012 includes, e.g., a wired or wireless network device operable to communicate data to and from, for example, the network 130. The network interface 1012 can receive input entry from a remote device, and transmit searching results to the remote device.

The device 1000 may perform certain operations or processes described in this document in response to the processing device 1002 executing software instructions contained in a computer-readable medium, such as the first data store 1004. A computer-readable medium can be defined as a physical or logical memory device and/or carrier wave. The software instructions can be read into the first data store 1004 from another computer-readable medium, such as a disc, or from another device via the network interface 1012. The software instructions contained in the first data store 1004 may cause the processing device 1002 to perform processes described in this document.

In implementations, the processes of parsing an input entry and performing map search described in this document can be applied separately, or be applied in combination with other map search or data process techniques. For example, the parsing result of the parsing system 200 can be used by a system which also obtains additional results from other systems for parsing or processing an input entry, and arbitrates which result to be used for map searching. The splitting confidence score output by the parsing module 230 can be used by the system in this example for the arbitration. As another example, a map search system may perform the map searching processes described in this document, as well as other map search processes using other techniques, to get multiple searching results, and synthesize the results of different processes to a final searching result for delivery to the user.

Embodiments of the subject matter and the functional operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system" encompasses all systems, apparatus, devices, and machines for performing the functions of the subject matter described herein, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this document can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this document, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

The locations of processes and operations associated with map search described in this document can be at one or more locations in a computer network or connected computer networks through which a user performs map search. In response to the user input entry for map search, the processes and operations associated with map search are triggered or caused to be performed at one or more computers by respective computer programs for the processes and operations associated with map search, including the parsing operations and search operations based on the results of the parsing operations described in this document. As an example, a computer-implemented map search method is provided to cause an input entry from a user for map search to be parsed, prior to conducting the map search based on the input entry, into a location part indicating location information in the input search entry and a query part indicating a search target associated with the location part in the input entry. This method also causes a map search to be conducted to obtain a geographic area or location based on the location part and to search for information on one or more entities that are associated with the query part and that are located at, within, or near the obtained geographic area or location.

While this document contains many specific implementation details, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of map search systems, apparatus and methods have been described. Variations and enhancements of the described embodiments and other embodiments can be made based on what is described in this document. For example, the actions described here can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
    parsing an input entry received from a user for map search into a token sequence containing a plurality of tokens, each token comprising a term which represents a segment of the input entry and a type annotated to the term;
    determining possible splitting positions of the token sequence, wherein each possible splitting position splits the token sequence into a possible location subsequence containing location information and a possible query subsequence indicating a search target, wherein the possible splitting positions include a position between two adjacent tokens of the token sequence, a position before the first token of the token sequence, or a position after the last of the token sequence, wherein determining the possible splitting positions of the token sequence comprises:
        determining, for each possible splitting position, a location statistic score and a query statistic score for each of two token subsequences generated from the possible splitting position; and
        identifying the token subsequence with a higher location statistic score as the possible location subsequence, and the other token subsequence as the possible query subsequence, wherein the location statistic score or query statistic score for a token subsequence is based on scores of items appearing in the token subsequence and scores of item types appearing in the token subsequence;

determining a splitting score for each of the possible splitting positions;

selecting a location subsequence and a query subsequence from the possible splitting position having the highest splitting score; and searching for information responsive to the query subsequence with a location that is near the location indicated by the location subsequence.

2. The method of claim 1, wherein parsing the input entry into the token sequence comprises: using a dictionary of address-related words to identify a word in the input entry as an address-type token.

3. The method of claim 2, wherein address-related words of the dictionary include at least one of administrative region names, road names, address-related suffixes, address-related prefixes and numbers.

4. The method of claim 1, further comprising prohibiting a splitting position between a token with a type of "Road" and a token with a type of "Number."

5. The method of claim 1, wherein determining the splitting score for each of the possible splitting comprises:

for each possible splitting position, using at least one of the location statistic score of the token subsequence identified as the possible location subsequence or the query statistic score of the token subsequence identified as the possible query subsequence to determine the splitting score for the possible splitting position.

6. The method of claim 5, wherein the splitting score for each of the possible splitting positions is determined by the sum of the location statistic score of the token subsequence identified as the possible location subsequence and the query statistic score of the token subsequence identified as the possible query subsequence.

7. The method of claim 6, wherein the query statistical score for the possible query subsequence for the possible splitting position includes:

a query multiplier that is based on the number of tokens in the possible query subsequence.

8. The method of claim 6, wherein the location statistical score for the possible location subsequence for the possible splitting position includes a location multiplier, wherein the location multiplier includes a base location multiplier associated with the location; and an additional multiplier if the possible location subsequence includes address-type terms in a hierarchical order.

9. The method of claim 1, wherein at least one of the location statistic score or the query statistic score of a token subsequence is determined by referring to a statistical model in which a location statistic score of a token subsequence indicates a probability that the token subsequence is a location, and the query statistic score of a token subsequence indicates a probability that the token subsequence is a query.

10. The method of claim 9, wherein the statistical model is generated based on training data including titles and addresses.

11. The method of claim 10, wherein training data addresses are preprocessed to remove tailing titles therein, and training data titles are preprocessed to remove prefixing administrative region names therein, before being used as training data.

12. The method of claim 10, wherein the statistical model is generated by:

parsing each piece of the training data including titles and addresses into a token sequence comprising a plurality of tokens, each token comprising a term and a type annotated to the term;

counting and storing the numbers of occurrences of a plurality of items that appear in the tokenized titles and addresses, of the training data, wherein the plurality of items include a plurality of at least one of: a unigram consisting of a single term, a bigram consisting of two adjacent terms, a sequence consisting of adjacent terms with type "None", a sequence of all terms appearing in a tokenized title or address, a type unigram consisting of a type associated with a unigram, a type bigram consisting of a type associated with a bigram, or a type sequence consisting of type associated with a sequence.

13. The method of claim 9, wherein determining a location statistic score or a query statistical score for a token subsequence comprises:

determining a term score for the token subsequence based on the scores of items appearing in the token subsequence, wherein the item scores are based on counts of the items in the titles and addresses of a corpus of training data;

determining a type score for the token subsequence based on scores of items types appearing in the token subsequence, wherein the item type scores are based on counts of the item types in the titles and addresses of the corpus of training data; and adding the term score and the type score of the token sequence.

14. The method of claim 13, wherein the item score for determining a location statistical score is determined by log (l_count)*l_count/(l_count+q_count), wherein l_count and q_count represent the numbers of occurrences of the item in addresses and titles in the corpus of training data.

15. The method of claim 1, wherein the parsing of the input entry into the token sequence further comprises:

identifying a token having a wrongly annotated type by comparing the type of the token to the type of an adjacent token of the token sequence;

fixing the token with the wrongly annotated type in the token sequence.

16. The method of claim 15, wherein fixing tokens with wrongly annotated types in the token sequence comprises:

changing a token of type "Quantifier Suffix" into a token of type "None" if the token does not follow a token of type "Number."

17. A system comprising one or more computers and one or more storage devices storing instructions, that, when executed by the one or more computers, cause the one or more computers to perform operations comprising:

parsing an input entry received from a user for map search into a token sequence containing a plurality of tokens, each token comprising a term which represents a segment of the input entry and a type annotated to the term;

determining possible splitting positions of the token sequence, wherein each possible splitting position splits the token sequence into a possible location subsequence containing location information and a possible query subsequence indicating a search target, wherein the possible splitting positions include a position between two adjacent tokens of the token sequence, a position before the first token of the token sequence, or a position after the last of the token sequence, wherein determining the possible splitting positions of the token sequence comprises:

determining, for each possible splitting position, a location statistic score and a query statistic score for each of two token subsequences generated from the possible splitting position; and identifying the token subsequence with a higher location statistic score as the possible location subsequence, and the other token subsequence as the possible query subsequence, wherein the location statistic score or query statistic score for a token subsequence is based on scores of items appearing in the token subsequence and scores of item types appearing in the token subsequence;

determining a splitting score for each of the possible splitting positions;

selecting a location subsequence and a query subsequence from the possible splitting position having the highest splitting score; and searching for information responsive to the query subsequence with a location that is near the location indicated by the location subsequence.

18. A machine-readable recording medium which stores instructions which, when executed by a machine, cause the machine to perform operations comprising:

parsing an input entry received from a user for map search into a token sequence containing a plurality of tokens, each token comprising a term which represents a segment of the input entry and a type annotated to the term;

determining possible splitting positions of the token sequence, wherein each possible splitting position splits the token sequence into a possible location subsequence containing location information and a possible query subsequence indication a search target, wherein the possible splitting positions include a position between two adjacent tokens of the token sequence, a position before the first token of the token sequence, or a position after the last of the token sequence, wherein determining the possible splitting positions of the token sequence comprises:

determining, for each possible splitting position, a location statistic score and a query statistic score for each of two token subsequences generated from the possible splitting position; and identifying the token subsequence with a higher location statistic score as the possible location subsequence, and the other token subsequence as the possible query subsequence, wherein the location statistic score or query statistic score for a token subsequence is based on scores of items appearing in the token subsequence and scores of item types appearing in the token subsequence;

determining a splitting score for each of the possible splitting positions;

selecting a location subsequence and a query subsequence from the possible splitting position having the highest splitting score; and searching for information responsive to the query subsequence with a location that is near the location indicated by the location subsequence.

19. The method of claim 13, wherein the item score for determining a query statistical score is determined by log $(q\_count)*q\_count/(l\_count+q\_count)$, wherein $l\_count$ and $q\_count$ represent the numbers of occurrences of the item in addresses and titles in the corpus of training data.

* * * * *